(12) United States Patent
Battista

(10) Patent No.: US 9,747,611 B2
(45) Date of Patent: *Aug. 29, 2017

(54) SYSTEM, METHOD, AND SOFTWARE FOR PREDICTING THE LIKELIHOOD OF SELLING AUTOMOTIVE COMMODITIES

(71) Applicant: Phillip Battista, Plainfield, NJ (US)

(72) Inventor: Phillip Battista, Plainfield, NJ (US)

(73) Assignee: Superior Integrated Solutions, Inc., Iselin, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,274

(22) Filed: May 24, 2016

(65) Prior Publication Data

US 2016/0267504 A1  Sep. 15, 2016

Related U.S. Application Data

(63) Continuation of application No. 14/978,911, filed on Dec. 22, 2015.

(60) Provisional application No. 62/095,488, filed on Dec. 22, 2014.

(51) Int. Cl.
| | | |
|---|---|---|
| *G06Q 10/00* | (2012.01) | |
| *G06Q 30/02* | (2012.01) | |
| *G06F 17/30* | (2006.01) | |
| *G06Q 30/06* | (2012.01) | |
| *G06Q 40/08* | (2012.01) | |

(52) U.S. Cl.
CPC ..... *G06Q 30/0202* (2013.01); *G06F 17/3053* (2013.01); *G06Q 30/0201* (2013.01); *G06Q 30/0629* (2013.01); *G06Q 30/0643* (2013.01); *G06Q 40/08* (2013.01)

(58) Field of Classification Search
CPC .................................................. G06Q 30/0202
USPC ............................................................ 705/7
See application file for complete search history.

(56) References Cited

U.S. PATENT DOCUMENTS

| | | | | |
|---|---|---|---|---|
| 8,645,193 B2* | 2/2014 | Swinson | ................ | G06Q 10/06 705/26.1 |
| 8,661,403 B2* | 2/2014 | Sullivan | ............. | G06Q 30/0202 707/706 |
| 9,189,800 B2* | 11/2015 | McBride | ............ | G06Q 30/0601 |

(Continued)

*Primary Examiner* — Edward Chang
(74) *Attorney, Agent, or Firm* — Howard & Howard Attorneys PLLC

(57) ABSTRACT

Provided are computer-implemented techniques for determining a probability of selling an (F&I) automotive commodity associated with a vehicle of interest to a consumer. Individual consumer data about the consumer interested in acquiring a vehicle is retrieved using an electronic interview. Dealer management system (DMS) data is retrieved and includes transactional data relating to automotive commodities. Group consumer data is retrieved about other consumers who have previously purchased the vehicle of interest, vehicles similar to the vehicle of interest, or automotive commodities associated with the vehicle of interest. Consumer resource data is retrieved from an online consumer resource. Deal data indicative of transactional terms is retrieved. The techniques predicatively analyze the retrieved data and compute a probability of selling at least one of the automotive commodities to the consumer based on predictive analysis. The techniques generate a displayable visual indicator that relates to the computed probability.

13 Claims, 23 Drawing Sheets

(56) References Cited

U.S. PATENT DOCUMENTS

| | | | |
|---|---|---|---|
| 2004/0243449 A1* | 12/2004 | Neustadt | G06Q 40/02 705/4 |
| 2010/0145792 A1* | 6/2010 | Worthen | G06Q 30/02 705/14.42 |
| 2014/0129290 A1* | 5/2014 | Sullivan | G06Q 30/0202 705/7.31 |
| 2014/0279263 A1 | 9/2014 | Liu et al. | |
| 2014/0358719 A1 | 12/2014 | Inghelbrect et al. | |
| 2015/0006250 A1 | 1/2015 | McBride et al. | |
| 2016/0180358 A1 | 6/2016 | Battista | |

\* cited by examiner

| FACTOR | GROUP BEHAVIOR/DATA (120) | INDIVIDUAL BEHAVIOR/DATA (130) | DEAL FACTORS/DATA (140) | VEHICLE SPECIFIC FACTORS/DATA (150) | INTERVIEW RESPONSES/DATA (160) |
|---|---|---|---|---|---|
| DESCRIPTION | What historically has been the behavior of like customers purchasing like vehicles? | Has the customer purchased a vehicle from dealership before? | Are there specifics to the transaction that alter the likelihood of selling products? | Are there vehicle specific factors that attribute to f&i product sales? | Interview questions can be configured to insert logic altering product need & likelihood |
| EXAMPLE | A higher % of customers that purchased a vehicle x also purchased vsc's | Customer previously purchased a vsc which would increase likelihood of similar future behavior | VSC penetration is 20% higher on retail finance vs. cash & lease deals | Vehicle Y comes with included interval maintenance which reduces need of maintenance plan | Customer plans on keeping vehicle 5 years & manufacter warranty is only 3 years |
| EXAMPLE #2 | Customer putting down $2000-$3000 are x% more likely to buy a vsc | | Large cash down/ significant trade-in equity reduces the need/value for gap insurance | Vehicle Y has the highest theft rate in maryland which increases need for security products | Customer keeps vehicle garaged at home and work decreasing need of security product |

FIG. 11

Deal #:
Customer Name:
Customer Email:
Customer Cell:
Vehicle Year:
Vehicle Make:
Vehicle Model:

Interview
Interview Status: Complete
9/30/14 1:45 pm EST

▼ Show More...

170

○ VSC INFO
○ MAINTENANCE INFO
○ TIRE WHEEL

Appearance Protection ○
GAP Protection ○
Security & Recovery System ○

172

○ $ Consumer Options Worksheet
○ ✗ Declination Page

👤
🛍 Accessories

Most Popular Accessories...

🛍 Stats

1. Floor Matts
$199.27

2. Mud Flaps
$129.45

3. Running Boards
$499.52

LOADING...

FIG. 13

| Products | | | -180 Options |
|---|---|---|---|
| Rank | Name | ◁ | Sell Price |
| 2 | Vehicle Service Contract by Stratosphere Ford | ⬚ Rate | $1,000.00 |
| 6 | AFAS Maintenance | Rate | $1,500.00 |
| 1 | PermaPlate APP | Rate | $800.00 |
| 7 | Disability Insurance | | $650.00 |
| 3 | Etch Identification | | $199.00 |
| 7 | Lease Wear & Tear | ⬚ Rate | $699.00 |

FIG. 15

DRIVER'S Needs Analysis

Barbara, Please See The Customized Protection Package Below Based on Your Specific Situation.

Vehicle Service Contract 

| | | 2015 SUV Generic |
|---|---|---|
| • Your vehicle comes with a manufacturer's limited warranty of 3 years or 36,000 miles.<br>• You've indicated that you anticipate owning the vehicle longer than the manufacturer's limited warranty leaving you without full coverage in the event of mechanical failure<br>• It is recommended that you protect your investment with a 60 month/ 100,000 mile Service Contract | 66 Month Term<br>$23.67<br>Monthly | $698.88     Payment<br>$29,789.00  Price<br>3.99%       APR<br>66 Months    Term |
| | 72 Month Term<br>$17.24<br>Monthly | |

Guaranteed Asset Protection 

| | | Optional Term |
|---|---|---|
| • In situations where the amount financed is greater than 60% of the purchase price, we highly recommend obtaining GAP insurance in the event of total loss<br>• Without GAP Coverage, you will be responsible for this difference adding an additional financial burden during a challenging time.<br>• A majority of customers that finance at Generic Auto Company opt in for GAP insurance | 66 Month Term<br>$10.68<br>Monthly | $658.79     Payment<br>$29,789.00  Price<br>5.99%       APR<br>72 Months    Term |
| | 72 Month Term<br>$6.23<br>Monthly | Top 3 Accessories<br>2015 SUV Generic |

Scheduled Maintenance 

| | | |
|---|---|---|
| • Your vehicle does not include standard maintenance coverage on wear and tear items<br>• Given that you expect to own your vehicle for 5 years and it doesn't include any maintenance coverage you will pay out of pocket for maintenance items the entire time you own it.<br>• In order to protect your investment and save on maintenance costs, we highly recommend a supplemental scheduled maintenance package | 66 Month Term<br>$15.87<br>Monthly | 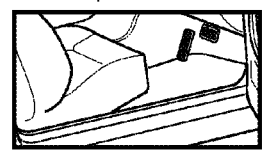Running Boards<br>$928.97 |
| | 72 Month Term<br>$10.15<br>Monthly | |

Add items at 66 months for a new payment of $754.38; X _____
Add items at 72 months for a new payment of $698.45; X _____

Other Available Options

| Tire & Wheel Protection | Enviroguard |
|---|---|
| Vehicle Recovery | Dent Repair |

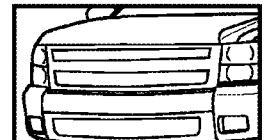
Genuine Floor Mats
$928.97

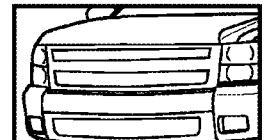
Hood Deflector - Chrome
$130.00

Coverage Type: TotalCare

Coverage Term: 60 Months

Coverage Millage: 100,000

Deductible: $0

Purchase Price: $2615

Display as Cost Per: DAY ▼

'Like Vehicles' Choose up to 3 vehicles to compare TCO
☑ 2016 Vehicle X
☑ 2016 Vehicle Y
☑ 2016 Vehicle Z
Add Other...

DISPLAY   EMAIL (PDF)   SAVE

LOADING...

FIG. 18

| <Customer Name> <br> <YEAR> <MAKE> <MODEL> <TRIM> <br> Phone: <Phone> <br> Email: <email> <br> Associate: <Sales Person> <br> Associate Phone: <Sales Phone> <br> Associate email: <sales email> | Stock#:     <Stock #> <br> Deal #:     <DEAL #> <br> Sale Price:     <Sale Price> <br> TTR & Fees:     <Sum Fees> <br> Down Payment: <Cash Down> <br> Rebate(s):     <REBATE TOTAL> <br> Amount Financed:     <Amt Financed. <br> Approx. Base Payment: <Monthly> |
|---|---|

COVERAGE OPTIONS:      210

| Vehicle Service Contract <br> Protect your vehicle with Parts and Labor coverage and rental and towing coverage. Gold 6/100,000 $100 Ded <br> Price: $2321.00 | Lojack <br> · 90% recovery rate <br> · 24-hour recovery or money back* <br> · Works directly with the police <br> $675.25 |
|---|---|
| Gap Protection <br> In the event of total loss Gap will cover any difference between your insurance payout and amount owed/ <br> $456.25 | Etch <br> VIN etching is a countermeasure to motor vehicle theft that involves etching a vehicle's VIN onto its windows to reduce the value of a stolen vehicle to thieves. <br> $199.99 |
| Environmental Protection <br> Keep your vehicles interior and exterior looking new with Caltex. <br> $857.75 | Maintenance <br> The most cost effective method of keeping your vehicle maintained ensuring warranty protection. <br> $1204.50 |

PAYMENT OPTIONS:

| TERM (Months) | 60 | 63 | 66 |
|---|---|---|---|
| APR | 5.90% | 5.90% | 6.50% |
| $1,000 | $344.00 | $324.00 | $311.00 |
| $2,000 | $329.00 | $314.00 | $307.00 |
| $3,000 | $311.00 | $310.00 | $301.00 |

Declination/ Acceptance Setup Page

Display Product Price: PER WEEK ▼

ACCEPT                                                                 DECLINE

| VSC $2,123.12 Edit |
Edit

| GAP $456.25 Edit |
Edit

| Enviro Protec $857.75 Edit |
Edit

| Lojack $675.25 Edit |
Edit

| Etch $584.00 Edit |
Edit

| Maintenance $1204.50 Edit |
Edit

☐ DISPLAY    ✉ EMAIL (PDF)    💾 SAVE

LOADING...

CONSUMER ACCEPTANCE & DECLINATION

Dealership Name  DEAL#: <DEAL#>
12 Somewhere Blvd  Customer: <FIRST LAST>
Somewhere, ST 12345  Vehicle: <MAKE MODEL>
Created By <USER>  VIN: <VIN>

CONSUMER ACCEPTS COVERAGE
I hereby certify that the following products/ services have been fully disclosed to me and I've accepted.

CONSUMER DECLINES COVERAGE
I confirm the following products/ services have been fully disclosed to me and I've declined.

230

Vehicle Service Contract
Coverage: Gold
Term:     50/100,000
Deductible:$100.00
*Price: $2,123.12*

$0.25 per day  GAP Protection
               *Price: $456.25*

$0.47 per day  Environmental Protection
               *Price: $857.75*

$0.37 per day  Lojack Security
               *Price: $675.25*

$0.32 per day  Etch Protection
               *Price: $584.00*

$0.66 per day  Prepaid Maintenance
               *Price: $1204.50*

Customer Signature(s):_____ Date:_____

FIG. 22

SYSTEM, METHOD, AND SOFTWARE FOR PREDICTING THE LIKELIHOOD OF SELLING AUTOMOTIVE COMMODITIES

CROSS-SECTION TO RELATED APPLICATIONS

The subject application is a continuation of U.S. non-provisional application Ser. No. 14/978,911 filed on Dec. 22, 2015, which claims the benefit of U.S. provisional patent application No. 62/095,488 filed on Dec. 22, 2014, the entirety of both being hereby incorporated by reference.

TECHNICAL FIELD

The disclosure generally relates to systems, methods, and software for predicting the likelihood of selling to a consumer an automotive commodity associated with a vehicle of interest to the consumer.

BACKGROUND

When it comes to selling automotive commodities, i.e., automotive products and services, automotive dealers are facing ever-increasing challenges. Today's consumers are more educated and informed of their options than before. Today's consumers also have a general distrust of dealership personnel.

Traditionally, dealership personnel have minimal insight into the needs of the consumer during the sales process. To compensate, dealership personnel reviewing automotive commodities with the consumer present virtually all of their commodities to virtually all of their consumers virtually all of the time. Dealership personnel do so to play the odds in hopes that the consumer will "bite" on at least one of the presented commodities. Such sales practices are conducted even when a particular commodity has little to no value for a consumer given the consumer's specific circumstance and knowledge. Furthermore, dealerships do not have consistency as to how and what commodities are offered to the consumers. Dealership personnel employ drastically inconsistent selling styles. Furthermore, since personnel are so often distracted by the opportunity to make a sale, dealerships lack understanding of the objective factors behind the sale of commodity. Instead, dealerships are fixated on sales figures and consumer service scores.

Furthermore, conventional techniques employed by selling commodities are manual and out-of-date. For example, sellers conventionally provide nothing more than static brochures or placemats describing products. These generic advertisements fail to impact customer decisions.

Additionally, dealers and commodity providers spend millions of dollars a year training personnel on how to conduct an in-person interview, which is the basis on which the sales process is founded. Despite all the effort that goes into this training, the results are often mediocre at best.

Therefore, conventional sales practices are inefficient because they often waste the time of the consumer and the dealership personnel. Additionally, conventional such practices potentially exacerbate the distrust consumers have toward dealership personnel. As such, conventional dealership sales practices do not maximize the likelihood of the consumer purchasing offered automotive commodities.

SUMMARY

One embodiment of a computer-implemented system comprising at least one processor and a non-transitory memory and instructions stored on the non-transitory memory is provided. The instructions when executed by the at least one processor cause the at least one processor to retrieve individual consumer data about a consumer interested in acquiring a vehicle, the individual consumer data indicative of at least one of (i) present or future needs of the consumer and (ii) historical behavior of the consumer, wherein the individual consumer data is retrieved at least in part from an interview being electronically administered to the consumer using a computing device. Dealer management system (DMS) data is retrieved from a DMS. The DMS data is indicative of transactional data relating to a plurality of automotive commodities being finance or insurance (F&I) products or services associated with the vehicle of interest. Group consumer data is retrieved about other consumers who have previously purchased the vehicle of interest, vehicles similar to the vehicle of interest, or automotive commodities associated with the vehicle of interest. The group consumer data indicative of at least one of (i) past needs of the other consumers and (ii) historical behavior of the other consumers. Consumer resource data about at least one of the automotive commodities and the vehicle of interest is retrieved from an online consumer resource. Deal data indicative of transactional terms relating to at least one of (i) current acquisition of the vehicle of interest by the consumer, and (ii) past acquisition of the vehicle of interest or vehicles similar to the vehicle of interest by other consumers is retrieved. The instructions when executed by the at least one processor cause the at least one processor to predicatively analyze the individual consumer data, DMS data, group consumer data, consumer resource data, and deal data. The instructions when executed by the at least one processor cause the at least one processor to compute a probability of selling at least one of the automotive commodities to the consumer based on predictive analysis of the individual consumer data, DMS data, group consumer data, consumer resource data, and deal data. The instructions when executed by the at least one processor cause the at least one processor to generate a visual indicator that is displayable on a display of a computing device. The visual indicator relates to the computed probability of selling the at least one of the automotive commodities.

One embodiment of a computer-implemented method is also provided. One or more computing devices comprising non-transitory memory and at least one processor are programmed to perform step of retrieving, with the at least one processor, individual consumer data about a consumer interested in acquiring a vehicle. The individual consumer data indicative of at least one of (i) present or future needs of the consumer and (ii) historical behavior of the consumer. The individual consumer data is retrieved at least in part from an interview being electronically administered to the consumer using a computing device. The at least one processor retrieves dealer management system (DMS) data from a DMS. The DMS data is indicative of transactional data relating to a plurality of automotive commodities being finance or insurance (F&I) products or services associated with the vehicle of interest. The at least one processor retrieves group consumer data about other consumers who have previously purchased the vehicle of interest, vehicles similar to the vehicle of interest, or automotive commodities associated with the vehicle of interest. The group consumer data indicative of at least one of (i) past needs of the other consumers and (ii) historical behavior of the other consumers. The at least one processor retrieves consumer resource data about at least one of the automotive commodities and the vehicle of interest from an online consumer resource.

The at least one processor retrieves deal data indicative of transactional terms relating to at least one of (i) current acquisition of the vehicle of interest by the consumer, and (ii) past acquisition of the vehicle of interest or vehicles similar to the vehicle of interest by other consumers. The one or more computing devices comprising non-transitory memory and at least one processor are programmed to perform step of predicatively analyzing, with the at least one processor, the individual consumer data, DMS data, group consumer data, consumer resource data, and deal data. The at least one processor computes a probability of selling at least one of the automotive commodities to the consumer based on predictive analysis of the individual consumer data, DMS data, group consumer data, consumer resource data, and deal data. The at least one processor generates a visual indicator that is displayable on a display of a computing device. The visual indicator relates to the computed probability of selling the at least one of the automotive commodities.

One embodiment of a computer software product is provided. The computer software product comprises instructions storable on a non-transitory computer-readable medium wherein the instructions when executed by at least one processor, are configured to retrieve individual consumer data about a consumer interested in acquiring a vehicle. The individual consumer data is indicative of at least one of (i) present or future needs of the consumer and (ii) historical behavior of the consumer. The individual consumer data is retrieved at least in part from an interview being electronically administered to the consumer using a computing device. Dealer management system (DMS) data is retrieved from a DMS. The DMS data is indicative of transactional data relating to a plurality of automotive commodities being finance or insurance (F&I) products or services associated with the vehicle of interest. Group consumer data is retrieved about other consumers who have previously purchased the vehicle of interest, vehicles similar to the vehicle of interest, or automotive commodities associated with the vehicle of interest. The group consumer data is indicative of at least one of (i) past needs of the other consumers and (ii) historical behavior of the other consumers. Consumer resource data about at least one of the automotive commodities and the vehicle of interest is retrieved from an online consumer resource. Deal data indicative of transactional terms relating to at least one of (i) current acquisition of the vehicle of interest by the consumer, and (ii) past acquisition of the vehicle of interest or vehicles similar to the vehicle of interest by other consumers is retrieved. The instructions when executed by at least one processor are configured to predicatively analyze the individual consumer data, DMS data, group consumer data, consumer resource data, and deal data. The instructions when executed by at least one processor are configured to compute a probability of selling at least one of the automotive commodities to the consumer based on predictive analysis of the individual consumer data, DMS data, group consumer data, consumer resource data, and deal data. The instructions when executed by at least one processor are configured to generate a visual indicator that is displayable on a display of a computing device. The visual indicator relates to the computed probability of selling the at least one of the automotive commodities.

The computer-implemented system, method, and software use specialized techniques to predicatively analyze various sources of information to determine which automotive commodities are most likely to sell to the specific consumer at hand, in a manner not previously possible. Using predictive analytics, those specific commodities that are most likely to sell can be offered to the consumer thereby increasing the consumer trust of dealership personnel. The system and method provide a fully integrated business intelligent application that is the next generation of F&I product sales and presentation. Using state of the art technology, the application provides dealerships real-time, "in-deal" predictive analytics wrapped up in easy to use consumer friendly presentations.

The system, method, and software alleviate challenges with selling automotive commodities because they eliminate the guesswork of which commodities the consumer will "bite" on. Dealership personnel reviewing automotive commodities with the consumer no longer have to present virtually all of their commodities to virtually all of their consumers virtually all of the time. The system, method, and software are configured to predict which commodities are of value to the consumer. Since the suggestions are tailored specifically for a particular consumer, their vehicle, and the financial situation, the application is likely to significantly affect the decisions of the consumer.

Furthermore, the system, method, and software provide consistency as to how and what commodities should be offered to the consumers thereby eliminating drastically inconsistent selling styles subjectively employed by each dealership personnel. Furthermore, the system, method, and software provide a complete understanding of the subjective and objective factors behind the sale of commodity thereby eliminating the human distractions and emotions, such as emotions related to meeting sales figures and consumer service scores.

Additionally, dealers and commodity providers no longer need to spend millions of dollars a year training of personnel on how to conduct mediocre in-person interviews because the software is configured to acquire the requisite information using computer-implemented techniques. Accordingly, the system, method, and software are highly efficient because they are largely automated and maximize the likelihood of the consumer purchasing offered automotive commodities and thereby most effectively use the time of the consumer and the dealership personnel. In addition, predictive determinations can be made nearly instantaneously thereby increasing the speed of the transaction.

BRIEF DESCRIPTION OF THE DRAWINGS

FIG. 8 is a sample screen shot of the interview setup page of the application.

FIG. 9 is a sample screen shot of the interview setup page of the application.

FIG. 11 is a chart of various factors that may be utilized in the predictive analysis employed by the system and method.

FIG. 13 is a sample screen shot of a suggestion page of the application.

FIG. 15 is a sample screen shot of the application showing automotive commodities ranked according to computed likelihood of consumer purchase.

FIG. 17 is a sample screen shot of a presentation generated by the application.

FIG. 18 is a sample screen shot of a presentation settings page of the

FIG. 20 is a sample screen shot of a commodities summary outputted by the application.

FIG. 21 is a sample screen shot of a declination page of the application.

FIG. 22 is a sample screen shot of an acceptance summary outputted by the application.

DETAILED DESCRIPTION OF THE INVENTION

I. System Overview

Referring to the Figures, wherein like numerals indicate corresponding parts throughout the several views, a system 30 for predicting the likelihood of selling an automotive commodity to a consumer and a method embodying the same are described herein. The system 30 and method of provide enhanced retail sales workflow.

Figure 1:
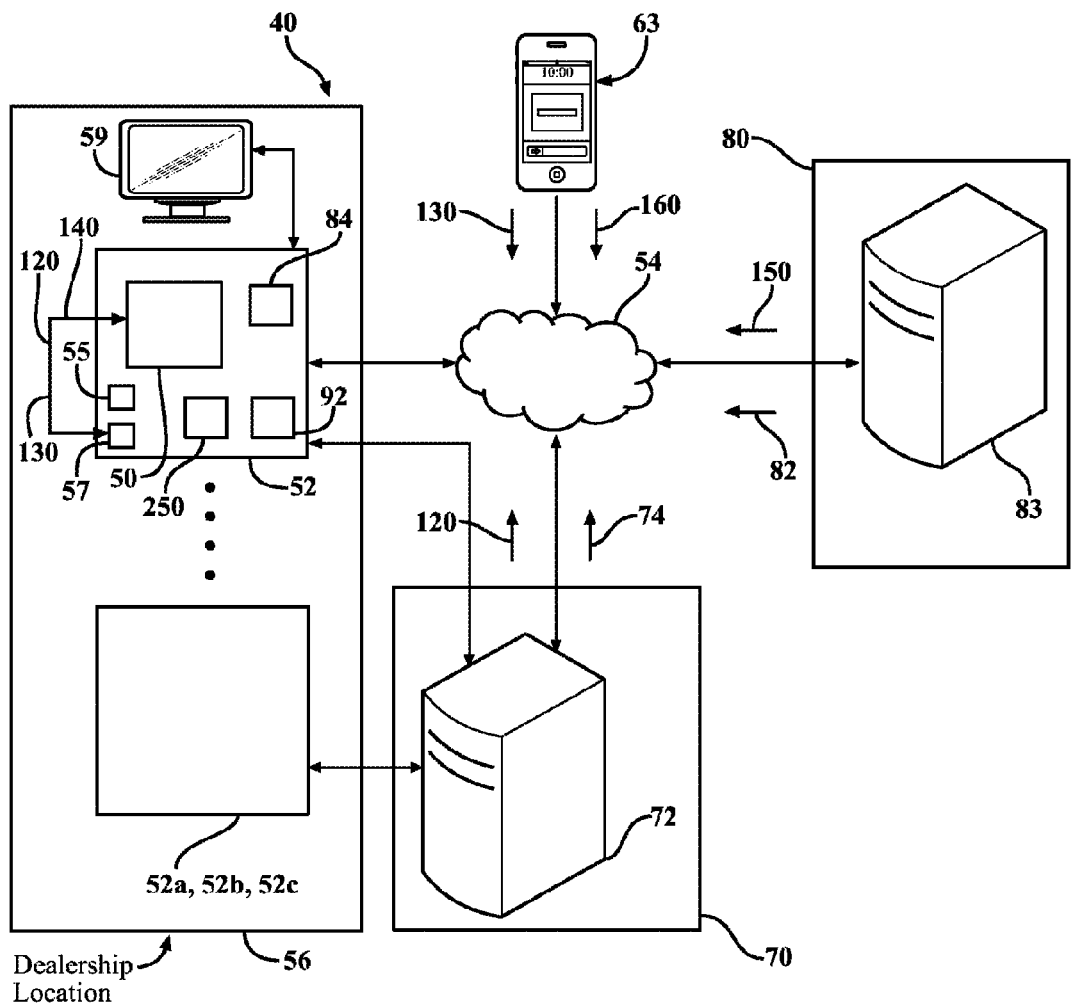
FIG. 1 is an embodiment of a system for implementing a method of offering an automotive commodity to a consumer using an application.

The system 30 according to one embodiment is shown in FIG. 1. The system 30 includes an application 50. The application 50 is implemented on a computing device 52. The application 50 is embodied as a software product providing machine-readable instructions that directs the computing device 52, or at least one processor 55 implemented on the computing device 52, to perform specific operations. The instructions of the application 50 may be stored on a memory 57 that is integrated with or in communication with the computing device 52. The processor 55 and the non-transitory memory 57 are implemented on a computing device 52 that is preferably affiliated with an automotive dealership, and may be located physically at the dealership or remote from the dealership.

The computing device 52 is connected to a network 54 for allowing transmission of data to and from the computing device 52. The network 54 may be the Internet or a private local area network. Alternatively, the network 54 may be a cloud-based network.

The computing device 52 may be desktop computing devices or mobile computing devices. Examples of mobile computing devices include, but are not limited to, tablets, smart phones, laptops, and the like. The computing device 52 includes or is connected to a display 59 and is configured to receive inputs.

In one embodiment, the computing device 52 is located at an automotive dealership 56 and accessible by dealership personnel working at the automotive dealership 56. The automotive dealership 56 is a business that sells new or used cars at the retail level, based on a dealership contract with an automaker or a sales subsidiary of the automaker. The automotive dealership 56 may include a dealership group comprising a plurality of stores 58. In such instances, there may be a plurality of computing devices 52a, 52b, 52c and each computing device 52a, 52b, 52c may be implemented at a different store 58. Each computing device 52a, 52b, 52c is connected to the network 54 and is configure to run the application 50. In another embodiment, the computing device 52 is implemented by a service provider that is employed by the automotive dealership 56.

A dealer management system (DMS) 70 is in communication with the network 54 and the computing device 52. The application 50 is integrated with the DMS 70. The DMS 70 may be implemented on the first computing device 52 along with the application 50. The DMS 70 is a software-based management information system created for the automotive dealership 64. The DMS 70 supports different aspects of running the dealership 64, such as, but not limited to tracking sales, parts inventory, finance, and administration involved with the sale of vehicles. The DMS 70 may further provide automatic processing of purchases, warranty claims, price lists and the like.

The DMS 70 includes a central server 72 which stores data provided on the DMS (hereinafter DMS data 74) thereby allowing multi-user access for a plurality of client computers. As such, where the dealership 56 includes several stores 66, the DMS 70 may be commonly implemented across the several stores 66. The DMS 70 may be implemented according to various other methods, including, using a centrally hosted, or software as a service/application service provider (SaaS) model.

As will be described in detail below, consumers of the automotive dealership 56 may interact with the application 50 through the computing device 52 or other units connected to the application 50 through the network 54. The consumer is a person, group of people, or entity who are the final users of the automotive commodity, e.g., automotive products or services.

A consumer resource 80 is connected to the network 54 and in electronic communication with the application 50. The application 50 is integrated with the consumer resource 80. In one example, the consumer resource 80 is a trusted and credible electronic third-party resource available to consumers independent of the automotive dealership 56. For example, the consumer resource 80 may be an entity or website, such as online resource for automotive information, such as Edmunds®, and the like.

The consumer resource 80 is an electronic source of consumer resource data 82. Consumer resource data 82 includes, but is not limited to prices for new and used vehicles, trade-in values, market values, incentives and rebates, dealer and inventory listings, vehicle test drive reviews, and other tips and advice relating to vehicle purchases and ownership. Those having ordinary skill in the art will appreciate that this list of consumer resource data 82 is representative only and that the list may include many other forms of consumer resource data 82 without departing from the scope of the invention.

In one example, the consumer resource 80 is a website hosted on at least one web server 83. The web server 83 is accessible by the computing device 52, and the application 50 through the internet. The application 50 may integrate with the consumer resource 80 through one or a plurality of Application Programming Interfaces (APIs 84). Each API 84 is a set of routines, protocols, and tools for connecting the application 50 to the consumer resource 80. The API 84 provides accessibility to various datasets available by the consumer resource 80. The API may be implemented directly on the computing device 52.

The application 50 is configured to administer an interview 90 electronically to the consumer to facilitate sale of the automotive commodity. The interview 90 may be administered on the computing device 52. Alternatively or additionally, as shown in FIG. 1, the consumer may interact with a remote computing device 63, such as a Smartphone, tablet, desktop computer, laptop computer, and the like. The interview 90 includes questions for the consumer to answer. The application 50 captures responses to the interview 90 questions. The application 50 extracts interview response data 92 from responses to the interview questions. This interview response data 92 may be retrieved by the application 50 over the network 54.

II. Workflow Overview

Figure 2:
FIG. 2 is a sample process flow of the typical steps involved with the purchase of a vehicle and an identification of where in the process flow the system and method are implemented.

FIG. 2 illustrates a sample process flow of the typical steps involved with the purchase of a vehicle and indicates where in this process flow the system and method are implemented. Typically, a customer begins with online shopping or browsing sales outlets, such as automotive sales websites, to determine vehicles of interest. Once the consumer has an idea of which vehicle is of most interest, the customer typically visits the showroom of the dealership to interact with the vehicle in-person. If the consumer remains interested in the vehicle, the dealership personnel engage in sales negations with the consumer to discuss terms. The system and method described herein are most advantages at next stage after negotiations. That is, as shown in FIG. 2, the system and method are primarily implemented at the stage where dealership personnel promote additional sales of automotive commodities (see bolded arrow). In one embodiment, the automotive commodity is a finance or insurance (F&I) product or service. Examples of F&I commodities include, but are not limited to, GAP insurance, vehicle security protection plans, vehicle maintenance plans, vehicle appearance protection plans, and the like. Other examples of automotive commodities include goods, such as accessories associated with the vehicle. For example, such accessories may be spoilers, liners, decals, mud flaps, or the like.

Those having ordinary skill in the art will appreciate that this list of automotive commodities is representative only and that the list may include many other goods and services without departing from the scope of the invention. For simplicity, the automotive commodities may be herein described as commodities, although it is to be understood that such commodities are automotive related. That is, these automotive commodities are associated with the vehicle of interest to the consumer after the preliminary negations have begun or completed at the dealership during consumer acquisition of the vehicle. In other words, these automotive commodities are components or services that may be added to the purchase of the vehicle, but are not the vehicle itself.

Unlike online websites, which focus on getting potential customers through the dealership door, the subject system and method are implemented at a later stage wherein the consumer is already through the door.

Once the consumer purchases the vehicle, and any associated commodities, the vehicle is delivered to the consumer, as shown in FIG. 2. Post sale marketing by the dealership may occur at any suitable times after delivery. This workflow is provided for purposes of explaining where in the process of purchasing a vehicle the system and method are focused. However, those skilled in the art appreciate that the scope of the system and method is defined by the claimed invention.

The system and method described herein may be utilized in various other workflows, including but not limited to, any one or combination of "in box", customer engagement in mobile, F&I office, salesperson to consumer via mobile, business development center (BDC) to consumer, and/or F&I office to consumer phone workflows, and the like.

III. Method Overview

The method includes offering an automotive commodity for sale using the application 50. The application 50 predicts the likelihood or probability of selling an automotive commodity to the specific consumer at hand using predictive analysis of various relevant sources of information. In one embodiment, the application 50 retrieves individual consumer data 130 about the consumer interested in acquiring a vehicle. The individual consumer data 130 is indicative of at least one of (i) present or future needs of the consumer, (ii) historical behavior of the consumer, and (iii) demographics of the consumer. The application 50 retrieves the DMS data 74 indicative of transactional data relating to a plurality of automotive commodities associated with the vehicle of interest. The application 50 retrieves deal data 140 indicative of transactional terms relating to at least one of (i) current acquisition of the vehicle of interest by the consumer, and (ii) past acquisition of the vehicle of interest or vehicles similar to the vehicle of interest by other consumers. The application 50 retrieves group consumer data 120 about other consumers who have previously purchased the vehicle of interest, vehicles similar to the vehicle of interest, or automotive commodities associated with the vehicle of interest. The group consumer data 120 is indicative of at least one of (i) past needs of the other consumers, (ii) historical behavior of the other consumers, and (iii) demographics of the other consumers. The application 50 retrieves consumer resource data 82 about at least one of the automotive commodities or the vehicle of interest from an online consumer resource. The application 50 may predicatively analyze any combination of these sources, i.e., individual consumer data 130, DMS data 74, deal data 140, group consumer data 120, and consumer resource data 82, and computes the probability of selling at least one of the automotive commodities affiliated with the vehicle of interest to the consumer based on predictive analysis. Various aspects of these steps are described in detail below.

Figure 3:
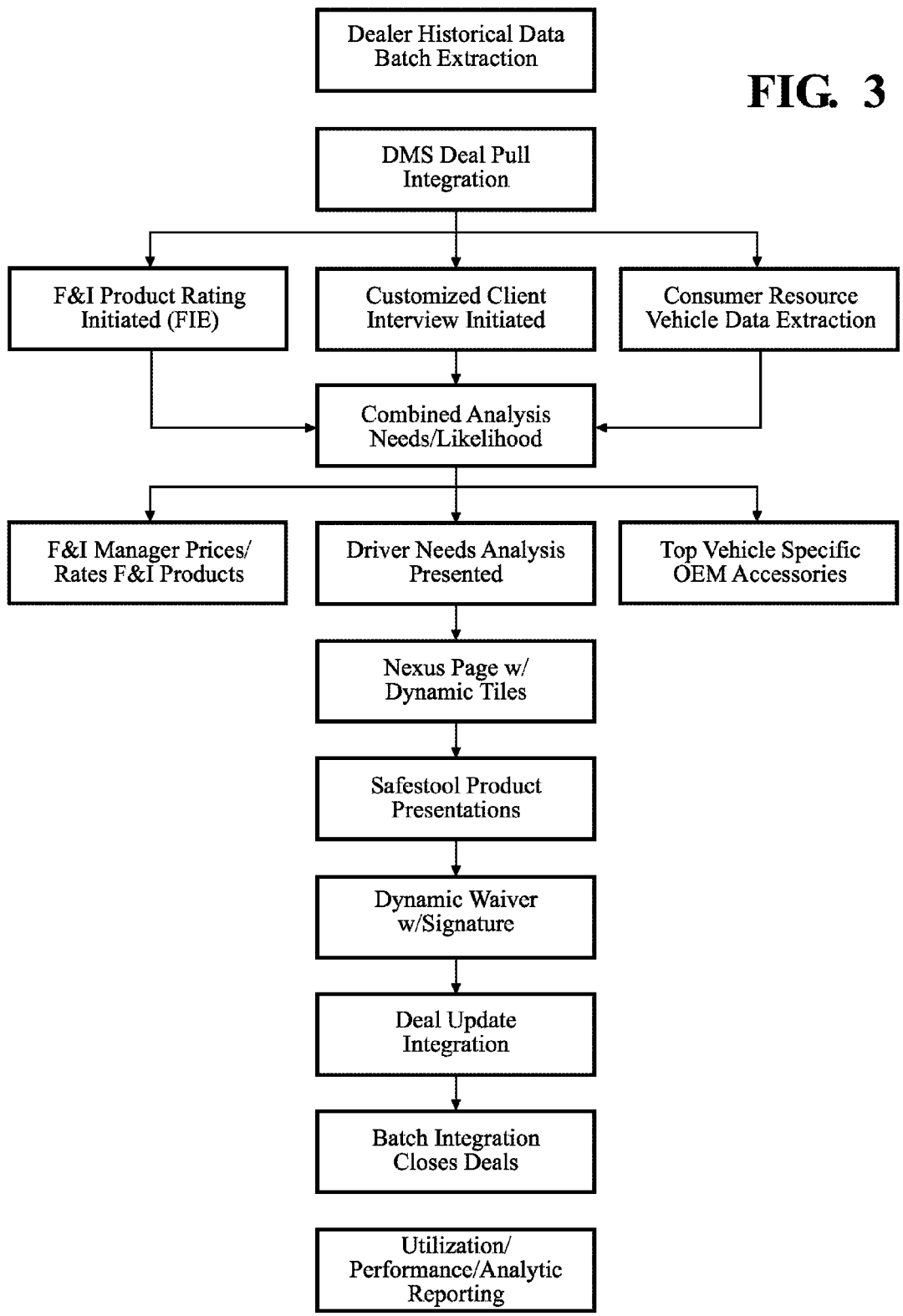
FIG. 3 is a sample workflow illustrating steps surrounding implementation of the system and method.

FIG. 3 is a sample workflow illustrating steps surrounding implementation of the system and method. The various steps shown in FIG. 3 are described in detail below. Of course, multiple paths may exist depending on dealer process, personnel, hardware setup, or the like. For example, these steps may include, but are not limited to, extracting historical dealer data using batch extraction techniques and integrating DMS deal pulls. The DMS data 74 is fed into a customized customer interview, initiation of F&I product ratings (FIE) and extraction of vehicle data from the consumer resource. These sources are analyzed to create a combined needs/likelihood determination. The determined needs/likelihood may be used as a basis for a consumer presentation, consumer suggestions for vehicle specific OEM accessories, and/or to update manager prices/rates for the various automotive commodities. The needs/likelihood is inputted into a nexus page of the application 50, which may include dynamic tiles for customizing a product presentation for the consumer, which functions as a sales tool. After presentation, the application 50 may allow consumers to interactively waive and sign off on declining/accepting any of the automotive commodities. Afterwards, continuous integrations and updates and data extractions may occur periodically or real time from the DMS 70. Ultimately, the deal closes and the application 50 can generate reports providing various sorts of analytical information relating to utilization, performance, or the like.

IV. Application Integration with DMS

As described, the application 50 is integrated with the DMS 70. More specifically, the application 50 is electronically integrated with the DMS 70. This integration may occur according to various methods. The application 50 may be linked directly into a DMS showroom application at the dealership 56. For example, the showroom application may include a link or button accessible to the consumer for launching and accessing the application 50. The application 50 may integrate into different areas of the showroom application. Additionally, the application 50 may be accessed according to other methods. Accessibility to the application 50 may be made available at specific times for maximizing the consumer experience. For example, the link or button for accessing the application 50 may be hidden or inactive until consumer interest is detected through particular events.

In one embodiment, the application 50 may be separate from the DMS 70. The application 50 may be integrated with the DMS 70 at the time of store setup. Alternately, the application 50 may be integrated with the DMS 70 after the store setup.

The application 50 is configured to electronically retrieve DMS data 74 relating to automotive commodities from the DMS 70. DMS data 74 may be various types of data. For example, the application 50 may obtain DMS data 74 relating to vehicle inventory transactions, such as single deal pulls. The application 50 obtains the vehicle inventory transactions on demand, e.g., at the time of the sales process. The application 50 executes vehicle inventory transactions quickly so not to impede or delay the consumer. The application 50 may employ different methods to retrieve the vehicle inventory transactions DMS data 74 may also include batch transaction data, such as data relating to completed consumer deals. Batch transactions include historical sales data for the dealership and are beneficial for populating reports for administrative purposes. The application 50 may request the batch transaction data from the DMS 70. The application 50 may retrieve the batch transaction data at any suitable time, such as at the time of store setup. Additionally, the application 50 may retrieve batch transaction data over any given range of time. For example, the application 50 may retrieve batch transaction data for the last five years. The application 50 may be configured to retrieve the batch transaction data automatically based on a set update frequency. The update frequency may be selectively adjusted. In one example, the update frequency may be set to every four hours during normal business hours. The application 50 may further be configured to access the batch transaction data on an on-demand basis such that the batch transaction data is retrieved the moment retrieval is requested.

Those having ordinary skill in the art will appreciate that the DMS data 72 described herein is representative only and that the application 50 may electronically retrieve many other types of DMS data 72 without departing from the scope of the invention.

A. Application Commodity Mapping with DMS

The application 50 may map the commodities in the DMS 70 as well as fees associated with the commodities in the DMS 70 according to different methods.

In one method, the application 50 receives as an input some or all the commodities the dealership 56 sells as well as the attributes associated with each commodity. The input may be in the form of a workbook completed by dealership personnel. The application 50 allows dealership personnel to associate the commodities with different templates or deal types. The templates are mapped with the associated commodities that are set up on the DMS 70. Through this association, the application 50 allows commodities to be written back to the DMS 70 when the commodity is sold. The application 50 may also map payments and attributes of the commodities in the DMS 70.

In another method, the commodities the dealership 56 sells as well as the attributes associated with each commodity are sent over to a vendor (service provider) who manages mapping of the information. In this method, the commodities that are sold need not be written back to the DMS 70 and payments need not be matched. This method allows the dealership 56 to setup its own application after batch transactions are run and immediately begin selling new commodities knowing that mapping is occurring through the vendor.

Figure 4:
FIG. 4 is a sample screen shot of a mappings page of the application.

As shown in a sample screenshot in FIG. 4, the application 50 may include a mappings page 100. The mappings page 100 displays results of the integration pull from the DMS 70 by the application 50. The mappings page 100 encourages dealership 56 personnel to review the results of the integration pull for maximizing use of the application 50 in the sale of the commodities.

The mappings page 100 further displays attributes of the commodities pulled from the DMS 70. For example, the mappings page 100 displays names of commodities as labeled in the DMS 70. The mappings page 100 also displays the commodity type. The commodity type is utilized for associating commodities to sales as well as for reporting purposes.

Access to the commodity type may be restricted and controlled only by authorized personnel. In some instances, the commodity type information may be updated to reflect commodity types listed in a Vehicle Service Contract (VSC). The mappings page 100 displays a count related to the commodity. The count specifies the number of times the commodity was sold based on the historical batch transaction. The mappings page 100 additionally displays a location related to the commodity. The location specifies where the commodity is categorically placed on the DMS 70. The mappings page 100 additionally displays a selectable tracking option related to the commodity. The track tracking option allows dealership 56 personnel to select whether or not the commodity is to be tracked in reports.

The mappings page 100 further displays activity data related to the commodity. Activity data specifies whether the commodity is still being sold. Activity data is important for optimizing the application 50 since dealership personnel are informed that the commodity is no longer being offered. Therefore, the application 50 need not waste resources on reporting and analyzing obsolete commodities. The mappings page further displays last sold date information relating to the commodity. The last sold date information specifies when the commodity was last sold to consumers. This information may be useful in expediting usage of the application 50 by alleviating a need to update information on historical commodities where the dealership is short on time.

On the mappings page 100, the application 50 may include a search function for searching the names of the pulled commodities. The application 50 also allows the attributes of the commodities to be sorted by name, type, count, and the like.

B. Commodity Mapping Setup

Figure 5:
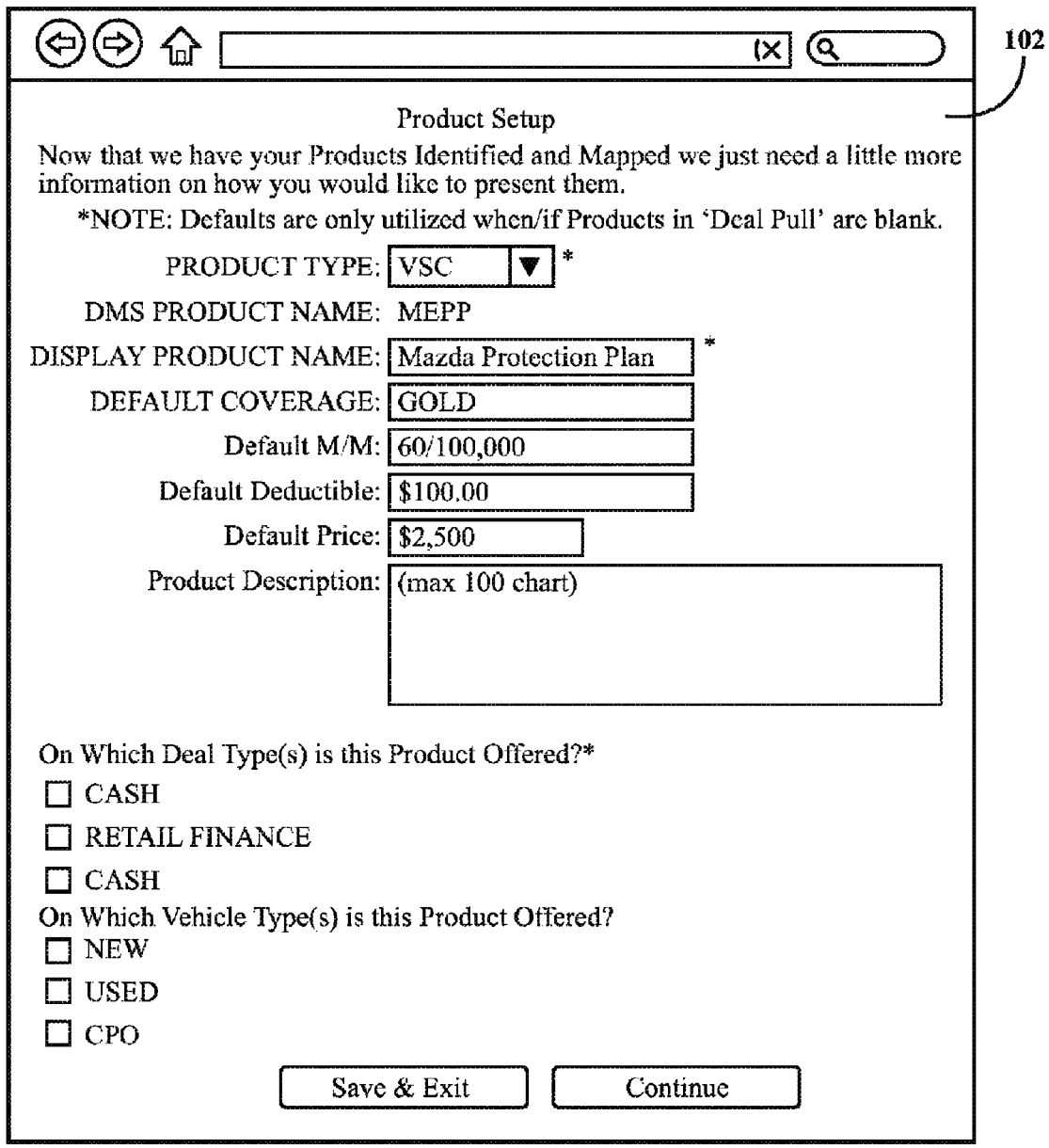
FIG. 5 is a sample screen shot of a commodity setup page of the application.

Once the commodities are identified and mapped on the mappings page 100, the application 50 may collect commodity information relating to each specific active commodity that has been mapped, as shown on a commodity setup page 102 shown in FIG. 5. Dealership personnel may interact with the commodity setup page 102 to enter commodity information.

The application 50 tailors presentation of the commodity to the consumer based in part on the commodity information inputted on the commodity setup page 102. The commodity information includes the commodity type, which is similar to the commodity type information displayed on the mappings page 100 and provided only for reference on the commodity setup page 102. The commodity information further includes the name of commodities as labeled in the DMS 70, also provided only for reference on the commodity setup page 102. The commodity information includes a display name for the commodity, which allows customization as to how the commodity is to appear in the application 50. The commodity information may also include commodity information extracted from the VSC of the commodity, such as default coverage information, default month/mileage, default deductible, and default price. The commodity information may include a commodity description, which allows a textual description of the commodity to be entered.

The commodity setup page 102 additionally allows dealership 56 personnel to select which deal type is related to the commodity. For example, the deal type may be a cash deal, a retail finance deal, lease deal, and the like. Deal type information related to the specific commodity is important for analysis and reporting purposes. For instance, if the deal type is a cash deal, and Gap coverage is not available on the cash deal, the application 50 analyzes information relating to the Gap coverage using non-cash deal information. The commodity setup page 102 also allows dealership 56 personnel to select which vehicle type the commodity is being offered. For example, the commodity may be offered on a new vehicle or a used vehicle. As such, the methods described herein may be implemented with any suitable deal involving the vehicle.

On the commodity setup page 102, the commodity information may be entered into text fields displayed by the application 50. The text fields may be may be mandatory or optional. Additionally, the text fields may be left blank by default or pre-loaded with information.

C. Integration and Mapping Notifications

Figure 6:
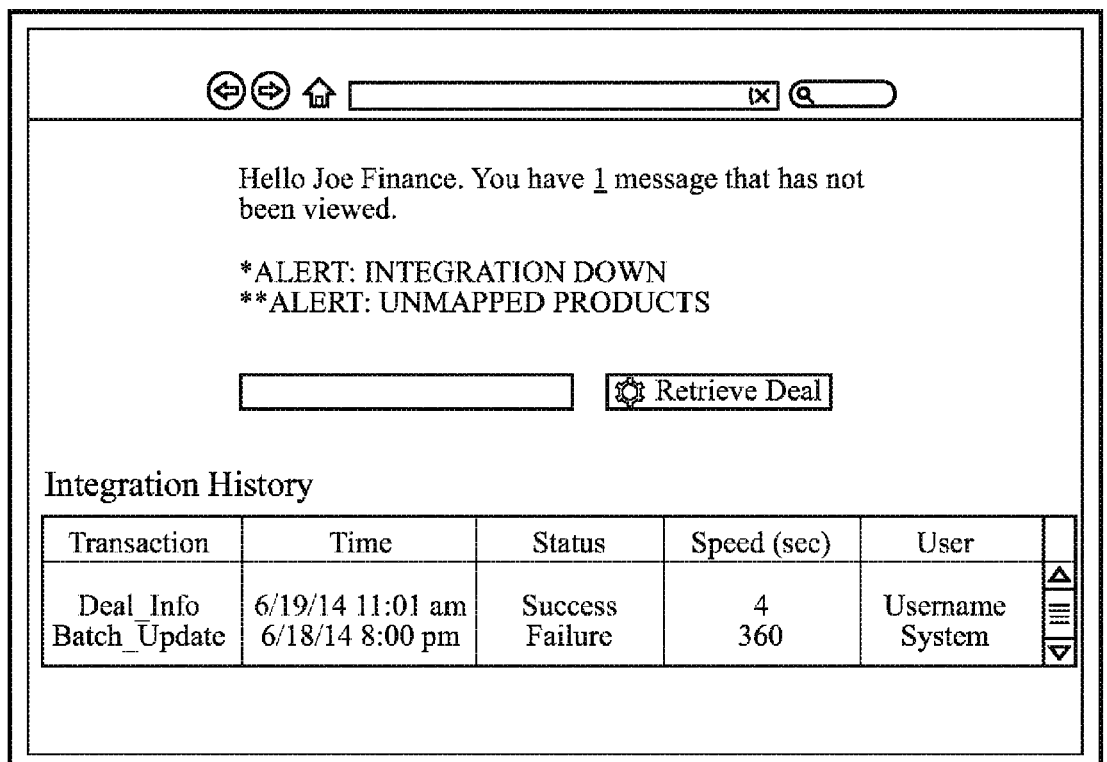
FIG. 6 is a sample screen shot of notifications issued by the application relating to integration and mapping.

The application 50 is configured to provide notifications 104 related to DMS 70 integration and commodity mapping, as shown in FIG. 6. Such notifications 104 may be triggered in the event an issue arises to inform dealership 56 personnel. The notification 104 may be displayed on any suitable page of the application 50, such a start screen or a deal pull screen. The application 50 may also provide the dealership 56 personnel with actions to be taken to rectify the issue.

In one example, the application 50 provides notifications 104 alerting that DMS 70 integration is not live or deactivated. This notification 104 is cleared once DMS 70 integration is live or activated.

Additionally, as shown in FIG. 6, the application 50 may provide notifications 104 alerting that commodities are unmapped. For example, a commodity may be unmapped where the real time vehicle inventory transaction data or the batch transaction data obtained through integration with the DMS 70 contain new or unclassified commodities. The application 50 may provide a support mechanism by which dealership 56 personnel may gain access to information relating to the unmapped commodities so that commodities may be properly mapped.

In another example, the application 50 provides the notification 104 to communicate status and history relating to integration with the DMS 70 and associated integration transactions. For example, the application 50 displays the transaction type (e.g., real time or batch transaction data), a request date and time of the transaction, a status of the transaction (e.g., pass or fail), the time (e.g., in seconds) required to execute the transaction, and a name of the personnel that requested the transaction to be run. If the transaction run was a batch transaction, the application 50 may display a default keyword (e.g., "system") rather than a name.

V. Consumer Resource Integration and Data Retrieval

As described, the application 50 application is integrated with the consumer resource 80. More specifically, the application 50 application is electronically integrated with the consumer resource 80. The application 50 electronically retrieves the consumer resource data 82 from the consumer resource 80. The application 50 is configured to electronically collect and store the consumer resource data 82 whenever the application 50 requests retrieval of the same. The application 50 integrates with the consumer resource 80 for different purposes and functions as compared with the DMS 70.

In embodiments where the application 50 integrates with the consumer resource 80 using the APIs 84, the APIs 84 provide accessibility to various datasets available by the consumer resource 80. The consumer resource data 82 may relate to at least one of the automotive commodities or the vehicle of interest. These datasets may each include various types of consumer resource data 82 retrievable by the application 50. One such dataset is vehicle specification information, such as vehicle make/model/year/trim/style, vehicle equipment, warranty information, VIN information, vehicle options, vehicle colors, etc. Another dataset includes vehicle pricing information, such as market value pricing, cost to own pricing, incentives, rebates, etc. Yet another dataset includes vehicle service information, such recalls, service bulletins, labor rates, maintenance schedules, and the like. Other datasets may include media, such as vehicle photo information and dealership content, such as dealership reviews and listings.

The application 50 may obtain other datasets from the APIs 84 and may employ any number of APIs. Additionally, the application 50 abides to usage restrictions when utilizing information derived from the consumer resource 80. Such usage restrictions may include volume restrictions, e.g., how many times the API 84 is called per day.

VI. Electronic Interview

A. Interview Overview

The application 50 is configured to host or collect data from an interview 90 administered to the consumer. The interview 90 includes questions to elicit consumer response.

The interview 90 is an electronically implemented and administered. The interview may be administered at the dealership using a mobile device or desktop computer accessible to the consumer. The interview 90 serves multiple purposes, such as obtaining contextual information about the consumer that is utilized when presenting and selling the commodity. The individual consumer data 130 may at least in part be acquired from the interview 90. For example, present or future needs of the consumer, historical behavior of the consumer, and/or demographics of the consumer, may be acquired from the interview 90. Since the interview 90 is implemented electronically, the application 50 ensures that the benefits of the interview 90 are maximized. In other words, dealership 56 personnel no longer may take shortcuts when administering an interview. As such, the interview 90 increases profitability by increasing the chance of selling the commodity. Additionally, the interview 90 is flexible and fast and is administered efficiently.

As described, the interview 90 may be administered on the computing device 63 of the consumer. In one example, the interview 90 may be implemented via text messages or mobile web pages on a consumer's Smartphone or tablet. For example, the consumer may be given an access code or password to register to the consumer to the system. This may provide confidential access and 2-way communication between the dealer and the consumer through the application 50.

The application 50 is configured to capture and store data (i.e., interview response data 92) derived from consumer responses to the interview 90 questions. In one embodiment, the application 50 sends the interview response data 92 to the DMS 70. The DMS 70 stores the interview response data 92 to assist in targeted follow-up sales marketing activities. The application 50 may store the interview response data 92 in a computer readable memory that is independent of the DMS 70.

In one embodiment, the interview 90 is integrated with the application 50. In another embodiment, the interview 90 is a component that may be selectively added to the application 50.

B. Interview Setup

The interview 90 may be customized and configured according to various methods. For example, the application 50 may provide configuration of the interview 90 questions. In one example, the application 50 may have access to a library of default questions and the interview 90 question may be one of the default questions obtained from the library. In another example, the application 50 provides the ability to customize interview 90 questions. For example, one of the default questions from the library may be customized or edited.

In one embodiment, the interview 90 is a required to fully utilize features of the application 50. In another embodiment, the interview 90 is optional. The application 50 may allow an option to select whether or not the interview 90 is required or optional.

The application 50 may provide various types of interviews 90. For example, one type of interview 90 may be a used car interview in which the interview 90 is administered and customized in view of the sale of used car. Alternatively, another type of interview 90 may be a new car interview in which the interview 90 is administered and customized in view of the sale of new car. The application 50 is configured to allow search and selection of one interview type among a plurality of interview types.

The application 50 may enable copying of interviews 90. More specifically, the application 50 may enable copying of interview 90 questions and types. For example, if the questions in the new car interview and the used car interview are known to be substantially similar, the questions from the new car interview may be copied as a starting point to generate the used car interview. The application 50 may further enable copying of interviews 90, as a whole. Copying interviews is particularly useful in instances where the automotive dealership group includes multiple stores and the group desires implementation of a common interview 90 at each of store.

The application 50 further enables configuration of the electronic formatting of the interview 90. For example, the application 50 enables selection of font size or font color displayed to the consumer. The application 50 also enables configuration as to how the consumer responds to each question. For example, an interview response may include a numerical input, a multiple choice answer, a drop down selection, a check box selection, a name input (formatted for first and last name), an address input (formatted for street/city/state/zip), an email address input (formatted with @), a monetary input (formatted with $), a date input (formatted for MM/DD/YYYY), and/or a time input (formatted for hour/minute/AM/PM).

In one embodiment, the interview 90 questions are derived from DMS data 74 obtained during integration. The application 50 may insert DMS data 74 into the interview 90 questions. For example, the DMS data 74 may include the first and last name of the consumer. The application 50 predicatively inserts the first and last name of the consumer into a question. For instance, the question may be "is this the name under which you want your vehicle to be registered?" In other embodiments, the application 50 inserts into a question the response to a prior question. Through these techniques, the application 50 expedites the interview process.

Figure 7:
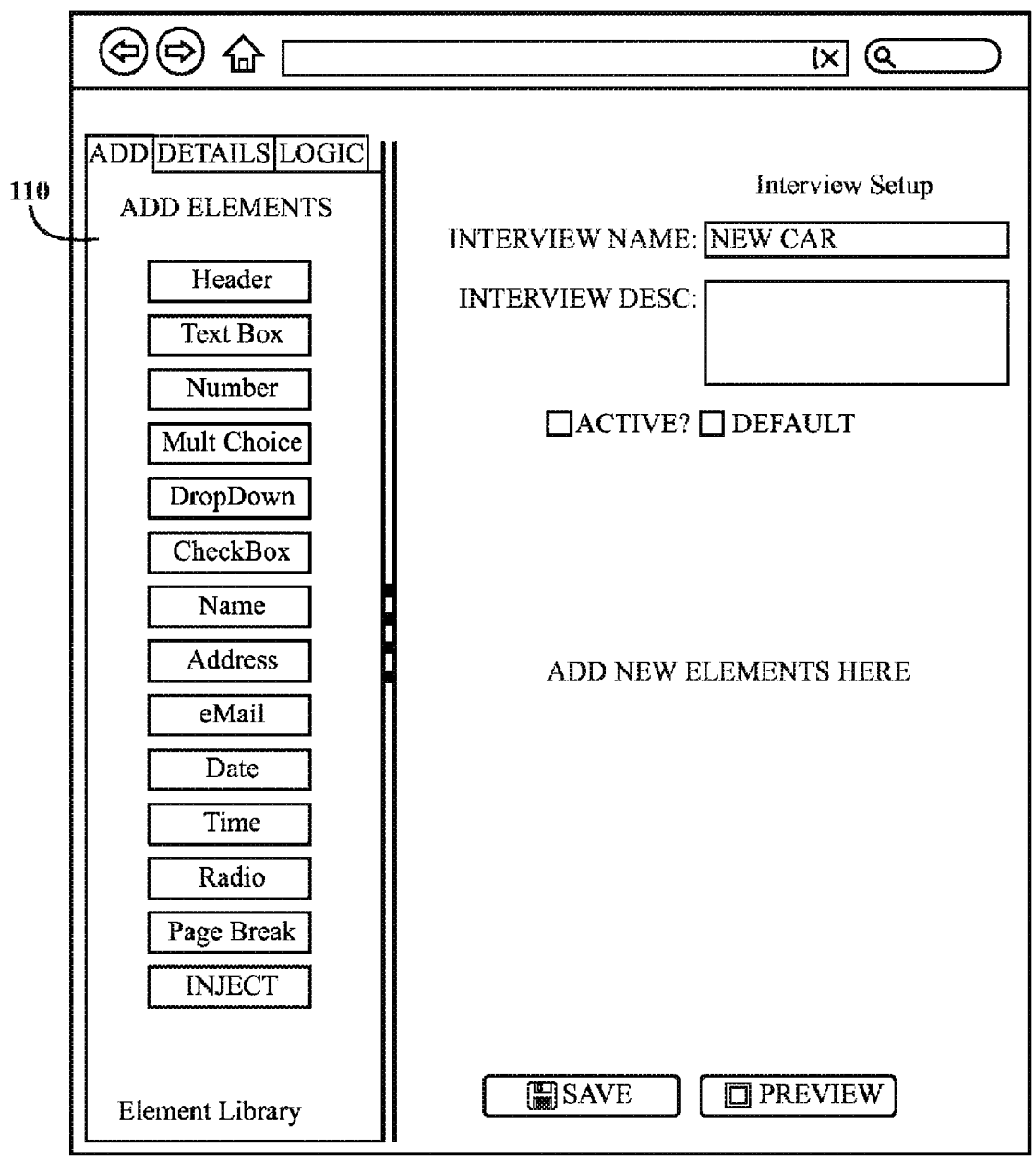
FIG. 7 is a sample screen shot of an interview setup page of the application.

The application 50 provides an interview setup interface 110, as shown in FIG. 7. The interview setup interface 110 enables easy configuration of the interview 90. The application 50 may display instructions for setting up the interview 90 and allowing for additional management of the interview 90, such as modifying existing interviews, copying interviews, and accessing the library. When the interview 90 is configured for the first time, the application 50 enables input of interview information, such as the name or description of the interview 90. The application 50 enables selection as to whether the interview 90 should be made available to users as well as selection as to whether the interview type should be a default preference in instances where more than one interview type is configured and available.

Figure 8:
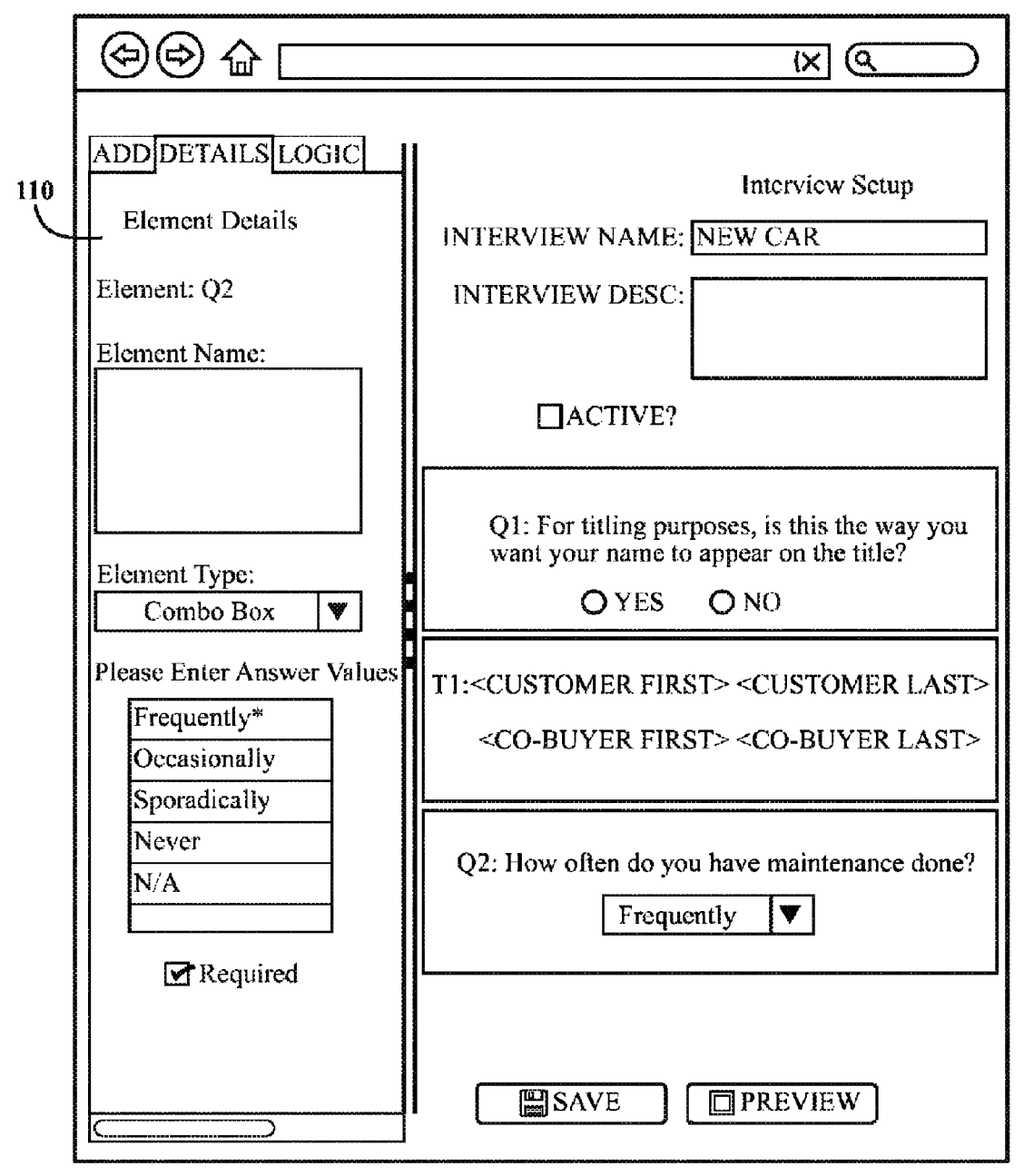

As shown in FIG. 8, the interview setup interface 110 further enable quick configuration of the electronic format of the interview 90 questions and attributes of the formatting. The application 50 is configured to save the settings of the interview 90 for future use. The application 50 further enables previews displaying exactly how the interview 90 would be displayed to the consumer.

C. Interview Logic

Figure 9:
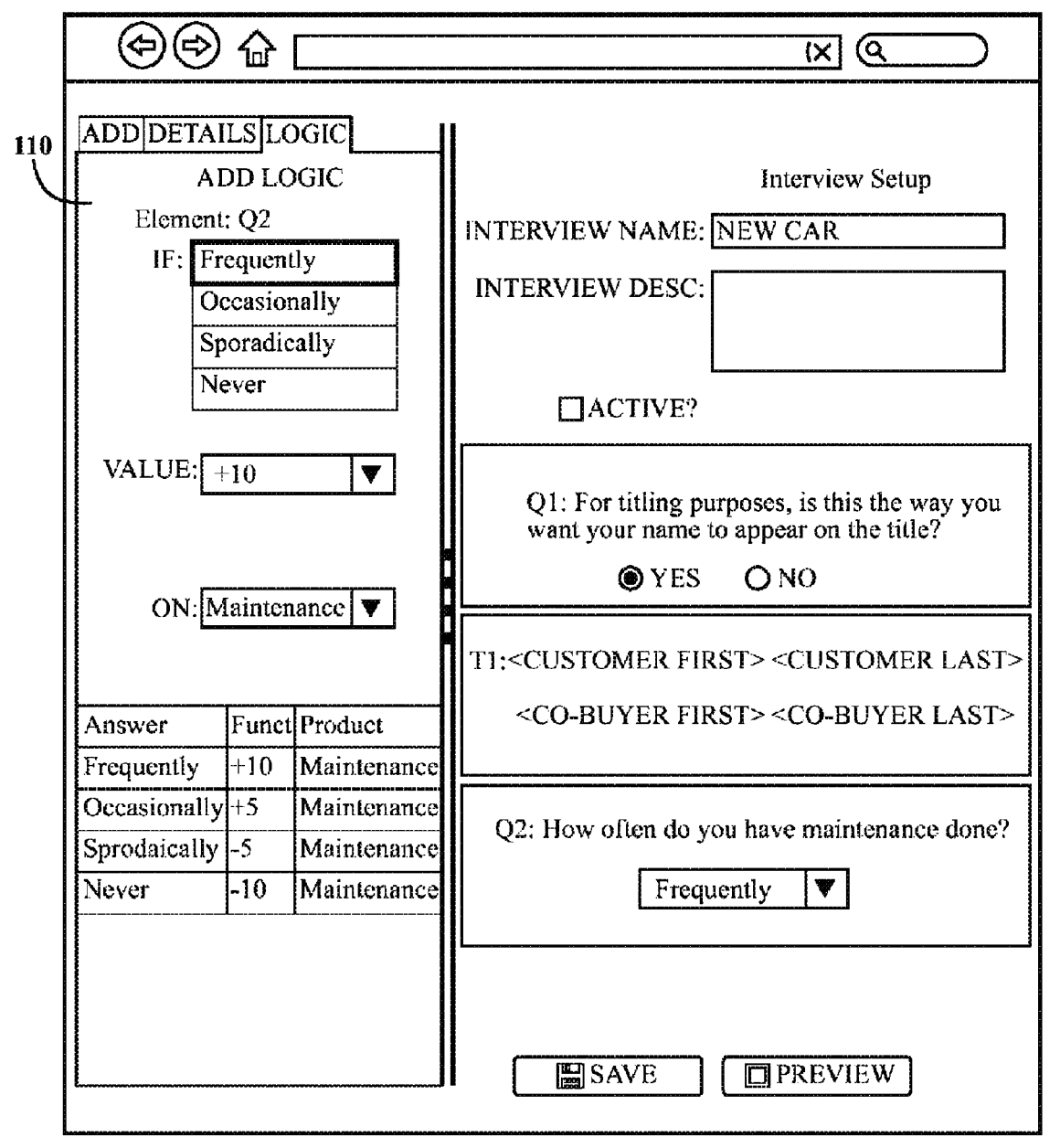

As shown in FIG. 9, the interview setup interface 110 further enables configuration of the logic values associated with responses to interview 90 questions. The logic values associated with responses to the interview 90 questions are analyzed for determining the probability of sale and value to the consumer. The application 50 analyzes the logic values to determine the importance of a particular commodity to the consumer. By incorporating logic values into the response and analyzing the logic values, the application 50 determines an increase or decrease in consumer need for the commodity or probability of sale for the commodity to the consumer. To illustrate, suppose an interview 90 question asks, "How often do you have maintenance done?" Depending on the response and associated logic values, the application 50 determines whether a prepaid maintenance plan is valuable to the consumer. Logic values associated with the responses may be derived from the numerous electronic inputs available for the interview response, including, but not limited to, numerical input, a multiple choice answer, a drop down selection, a check box selection, a date input, and the like.

Based on the responses to the interview 90 questions, the application 50 may monitor value of the interview 90 with respect to tailoring the commodities offered for sale. In one example, usefulness of the interview 90 is determined by analyzing logic values in the responses. The application 50 may display value of the interview 90 on a movable scale. The logic values may affect the scale positively and negatively such that the scale moves accordingly.

VII. Data Analysis

The application 50 analyzes the aforementioned data to predict an opportunity to sell a commodity from among the plurality of commodities. The application 50 may predicatively analyze any combination of the data described herein to generate suitable predictions. In one embodiment, the application 50 predicatively analyzes at least the individual consumer data 130, the DMS data 74, and the deal data 140. In another embodiment, the application predicatively analyzes at least two of the individual consumer data 130, DMS data 74, deal data 140, group consumer data 120, and consumer resource data 82.

Predicting the likelihood of the consumer purchasing the commodity entails taking into account the need of a consumer to purchase a commodity as well as the probability of the consumer purchasing the commodity. Based on the inputted data, the application 50 predicts the needs of the consumer and predicts which commodity is most likely to sell when offered to the consumer. By doing so, the application 50 simplifies and increases the probability of selling the commodity because the application 50 analyzes information not conventionally and readily available to dealership 56 personnel.

The application 50 may utilize any suitable hardware and/or software for analyzing the data. For example, the computing device 52 may utilize the processor 55 to execute software instructions (e.g., routines or code) provided by the application 50 to analyze the data. The instructions may be stored in a non-transitory computer-readable memory 57. The memory 57 may be implemented directly on the computing device 52 or may be accessed from a location outside of the computing device 52.

Figure 10:
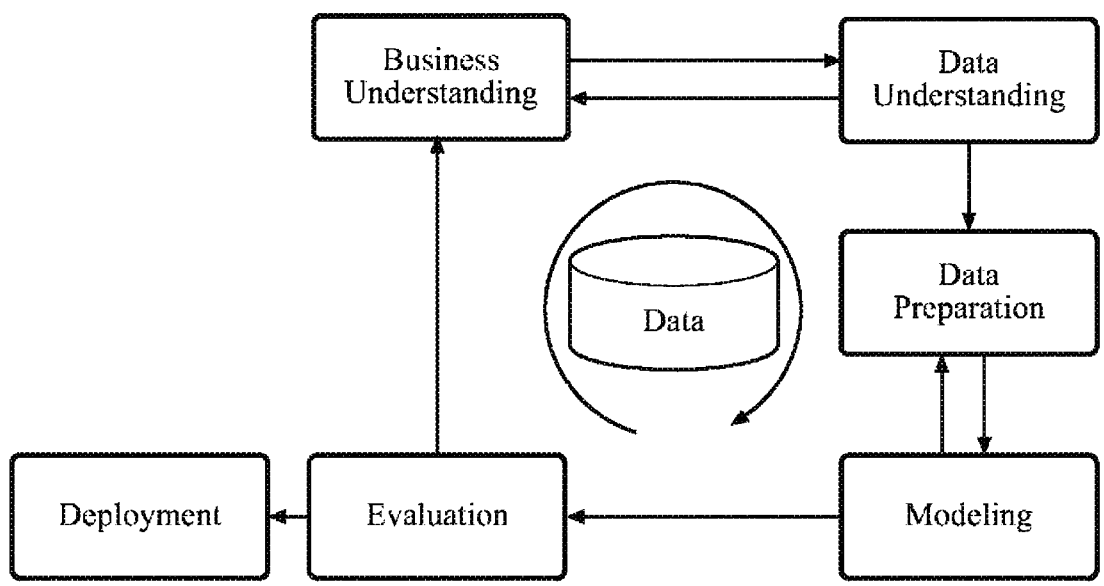
FIG. 10 is a flow chart illustrating predictive analytics techniques employed by the application according to one embodiment.

The application 50 utilizes predictive analytics to analyze the data from the various sources. FIG. 10 is a flow chart illustrating implementation of the predictive analytics by the application 50 according to one embodiment. The application 50 may utilize any suitable method or model of predictive analytics. In FIG. 10, the application 50 utilizes a model of predictive analytics known as Cross Industry Standard Process for Data Mining (CRISP-DM). This model is tailored specifically to the system and method described herein. That is, the various data inputted into the application 50, as described herein, coupled with the unique objective of predicting the sale of automotive commodities have created a novel implementation of this model.

As illustrated in FIG. 11, the application 50 utilizes many factors and data sources in the predictive analysis. Some of these factors are derived from the interview responses. Other factors are derived historical information. Each of the factors alters the probability of selling the commodity or the predicted need of the consumer. The data from each of the factors may be derived from the any of the sources identified herein. In addition, the text described in FIG. 11 under each factor is intended to illustrate some examples of each factor, but is not intended to limit each factor to only what is written.

One factor the application 50 utilizes in predictive analytics is group behavior or data 120. Here, the application 50 mines and extrapolates data to analyze the behaviors or actions of prior groups of consumers in certain situations. The application 50 determines trends/patterns/correlations in the behaviors of the prior groups in the certain situation. The application 50 predicts the behavior of a current or future consumer in similar situations. Thus, the application 50 utilizes predictive analytics to connect the sales data to past behavior for making predictions about future behavior. Correlations may be causal or linear. Alternatively, correlations may be statistical dependences between the data and the consumer behavior.

Examples of some group consumer data includes, consumers who have previously purchased the vehicle of interest, vehicles similar to the vehicle of interest, or automotive commodities associated with the vehicle of interest. The group consumer data may be indicative of at least one of past needs of the other consumers, historical behavior of the other consumers, and/or demographics of the other consumers. The group consumer data 120 may include past, present, or future data relating to other customers.

In determining group behavior 120, the application 50 may obtain data about other consumers from DMS data 74, including batch transaction data or the inventory transaction data. The DMS data 74 utilized in determining group behavior 120 includes DMS data 74 relating to consumers, vehicles, and deals. Examples of DMS data 74 relating to consumers include, but are not limited to, birth year (range), city/town, co-buyer (y/n), salutation, state, and zip code. Examples of DMS data 74 relating to vehicles include, but are not limited to, mileage, model, make, MSRP, and type. Examples of DMS data 74 relating to deals include, but are not limited to, amount financed (range), APR (range), cash down (range), deal type, commodity manager, monthly payment (range), sales manager, salesperson, term, trade actual cash value, trade equity (range), trade make, trade mileage, trade model, trade year, and transaction type.

In determining group behavior 120, the application 50 may obtain data about other consumers from the consumer resource data 82 and interview response data 92. Additionally, the application 50 may obtain consumers service history, consumers relationship management (CRM) sales, consumers credit history, consumers zip code, consumers home value, and the like.

The application 50 determines trends or patterns relating to group behavior 120. In one example, the application 50 determines a correlation between the purchase of a specific commodity and the zip code and home value of the consumer. In another example, the application 50 determines consumers who purchased a particular vehicle are more likely to purchase the commodity. In yet another example, the application 50 determines that consumers who commit to a down payment within a particular range are more likely to purchase the commodity. The application 50 may identify the strength of the correlation by a correlation factor, such as a percentage. For example, the application 50 may determine that the consumer is 20% more likely to purchase the commodity or that the consumer.

As shown in FIG. 11, another factor the application 50 utilizes in predictive analytics is individual consumer behavior or data 130. Individual consumer data 130 may include past, present, or future data relating to the consumer at hand. In one example, individual consumer data 130 is indicative of at least one of present or future needs of the consumer, historical behavior of the consumer, and demographics of the consumer. In one example, this may include individual prior behavior, including whether a specific consumer previously purchased a vehicle from a dealership. The application 50 analyzes past behavior of the specific consumer to predict current or future behavior of the specific consumer in purchasing certain commodities. With individual prior behavior 130, the previously purchased vehicle may be the same or different from the new vehicle. Additionally, the previous dealership need not be the same as the new dealership. In one example, the application 50 determines that the consumer purchased a VSC for the previous vehicle and predicts a probability of this same consumer purchasing another VSC for the new vehicle.

As is described in detail below, by examining individual consumer data 130, the application 50 dramatically improves presentation of the commodity to the consumer. For example, the application 50 may display a comment during presentation of the commodity as follows: "I see you previously opted to protect your trade-in vehicle utilizing product X, would you similarly like to protect your new vehicle utilizing product X?"

Another factor the application 50 utilizes in predictive analytics is a deal data or factors 140. The deal data 140 is data relating to the specifics of the transaction (deal) between the consumer and the dealership for purchase of the vehicle of interest. The deal data 140 may be indicative of transactional terms relating to at least one of current acquisition of the vehicle of interest by the consumer, and past acquisition of the vehicle of interest or vehicles similar to the vehicle of interest by other consumers. The application 50 determines an increase or a decrease in the probability of purchase of the commodity and/or the perceived need of the consumer to purchase the commodity based on the deal data 140. For example, if the transaction is a cash/retail finance deal, the application 50 may determine that there is a decreased probability of selling lease wear and tear service. If the transaction is a cash or lease deal, the application 50 may determine that there is a decreased probability of selling GAP insurance. If the transaction involves a large down payment or significant trade equity, the application 50 may determine that there is a decreased probability of selling GAP insurance. In yet another example, if the transaction involves a consumer over a certain age, the application 50 may determine that there is a decreased probability of selling credit life insurance.

Alternatively, some deal data 140 may increase the probability of purchase and/or the need of the consumer given certain scenarios. For example, if the transaction involves a consumer who has negative equity in a trade, the application 50 may determine that there is an increased probability of selling GAP insurance. Similarly, if the transaction involves a consumer having less than 20% of the purchase price of the vehicle, the application 50 may determine that there is an increased probability of selling GAP insurance. The application 50 may also determine that VSC penetration is 20% higher on retail finance deals as compared with cash and lease deals.

Another factor the application 50 utilizes in predictive analytics is a vehicle specific data 150. Vehicle specific data 150 relate to specifics of the vehicle being purchased.

The application 50 may determine that some vehicle specific data 150 decreases the probability of purchase and/or the need of the consumer given certain scenarios. In one example, vehicle specific data 150 includes warranty information associated with the vehicle. For example, if the vehicle comes with a manufacturer warranty and consumer plan on keeping the vehicle for a duration less than the coverage period, the application 50 may determine that there is a decreased probability of selling a VSC. If the vehicle comes with pre-paid maintenance and consumer plans to keep the vehicle less that the coverage period, the application 50 may determine that there is a decreased probability of selling a maintenance plan on the vehicle. If the consumer intends to purchase a certified pre-owned vehicle, the application 50 prompts the user with a warranty coverage window to allow the user to input the start dates and expiration mileage for the various warranties of the vehicle.

Alternatively, the application 50 may determine that some vehicle specific data 150 increases the probability of purchase and/or the need of the consumer given certain scenarios. For example, if the vehicle has a high theft rate in a given location (e.g., state), the application 50 may determine that there is an increased probability of selling a security commodity. In another example, if the vehicle does not come with pre-paid maintenance and consumer plan, the application 50 may determine that there is an increased probability of selling a maintenance plan on the vehicle.

The vehicle specific data 150 may include the consumer resource data relating to at least one of the automotive commodities or the vehicle of interest, which is acquired from the consumer resource 80.

Yet another factor the application 50 utilizes in predictive analytics is interview response data 160. Here, the application 50 may determine that some logic values in the interview responses alter the probability of selling the commodity or the predicted need of the consumer. As described, the individual consumer data may be retrieved at least in part from the interview being electronically administered to the consumer. The responses from these interviews may be used to assess the probability that the consumer will purchase certain commodities.

Some interview response factors may decrease the probability of purchase and/or the need of the consumer given certain scenarios. For example, if logic values in a response indicate that the consumer keeps the vehicle in a garage at home and work, the application 50 may determine that there is a decreased probability of selling a security commodity.

Alternatively, some interview response factors may increase the probability of purchase and/or the need of the consumer given certain scenarios. For example, if logic values in a response indicate that the consumer plans to keep the vehicle for five years when the manufacturer warranty is only 3 years, the application 50 may determine that there is an increased probability of selling an extended warranty on the vehicle.

It is to be appreciated that in some embodiments the predictive analytics described herein may be accomplished exclusively using sources other than interview responses. In other words, consumer needs may be implied or interpolated based on other data.

By combining the customization of the interview with predictive analytics, the application 50 provides an even more complete picture to predict the behavior of the consumer as it relates to each of the commodities offered.

Figure 12:
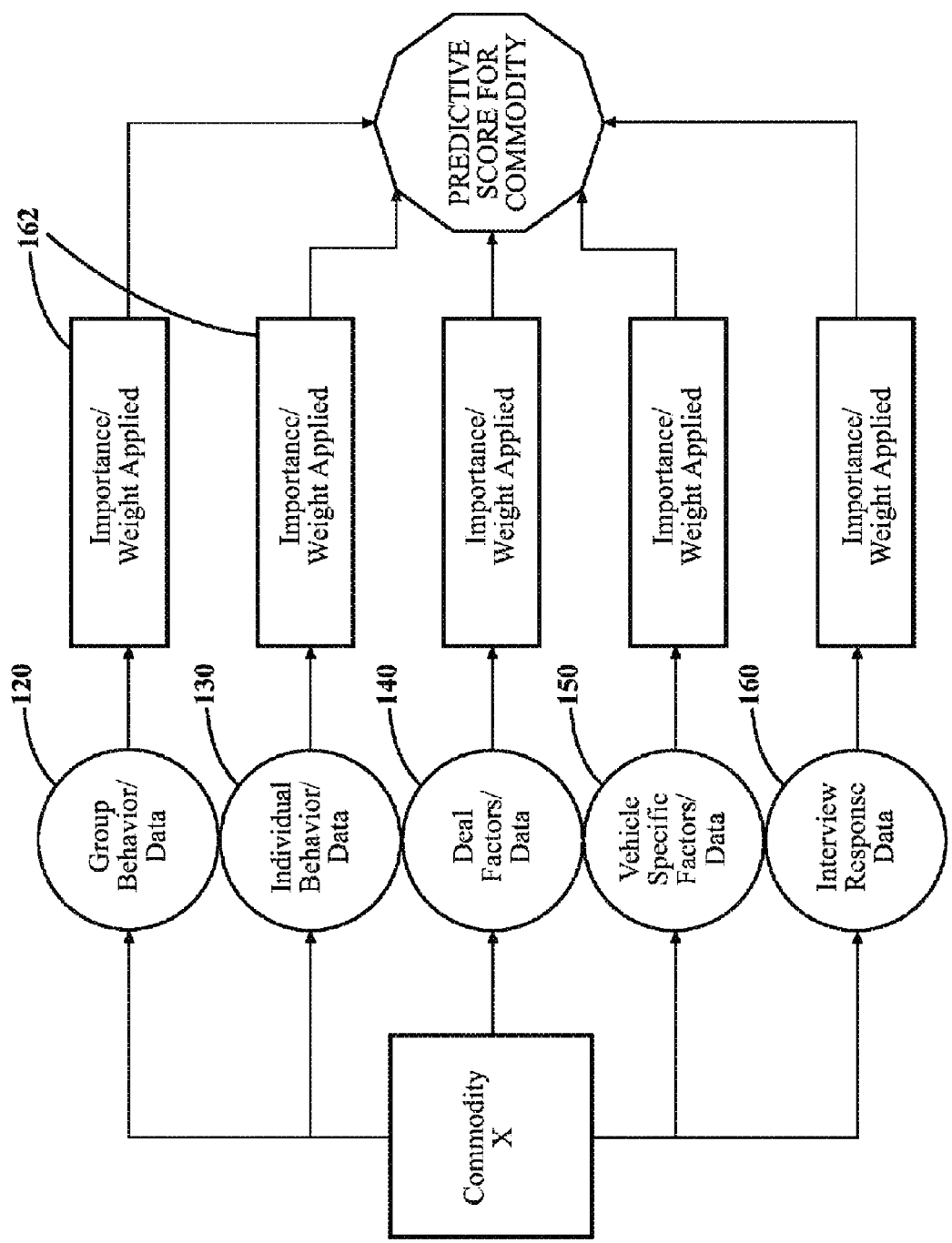
FIG. 12 is a flow chart illustrating predictive analysis employed by the application according to one embodiment.

FIG. 12 is flow chart illustrating predictive analysis employed by the application 50 in determining the probability of selling a specific commodity, according to one example. As shown, for a given commodity, the factors described (i.e., group behavior 120, individual prior behavior 130, deal data 140, vehicle specific data 150, and interview response factors 160) are weighted by the application 50. The application 50 is configured to calculate the weight 162 of each factor for determining the relative importance of each factor. The application 50 combines the weights 162 to determine a predictive analytics score (PAS) for the specific commodity. As an alternative to what is illustrated in FIG. 12, the factors illustrated therein may be replaced by the DMS data, individual consumer data, group consumer data, consumer resource data, and deal data.

Accordingly, the application 50 generates predictive behavior to be for each of the applicable commodities. The application 50 utilizes multiple factors that need to be combined to show an overall 'score' or probability to the end user. Certain factors may have various weights or influences for determine the reality of the decision at hand specific to a particular product. As such, the application utilizes specialized algorithms for making the prediction.

The predictive behavior may be displayed in various forms. In one example, the predictive behavior is outputted into a simple format, such as a sentence that "the consumer is likely to purchase product X." Predictive behavior may be presented according to other formats and methods, as described below.

The application 50 may determine the PAS utilizing various mathematical algorithms. In one example, the application 50 utilizes a weighted average formula to assign a specific weight modifier (e.g., a percentage) to the values of each factor. The weight modifier may be a representation of importance of the commodity to the consumer.

In one example, the predictive behavior may be represented by the following formula, wherein PAS is the predictive analytics score for the given commodity, $f_1$ to $f_n$ are the determined values of each factor, and $\alpha_1$ to $\alpha_n$ are the weight modifiers assigned to each factor:

$$PAS = \alpha_1 f_1 + \alpha_2 f_2 + \alpha_3 f_3 + \alpha_4 f_4 + \alpha_5 f_5 \ldots \alpha_n f_n$$

In another embodiment, the predictive behavior may be represented by the following formula $((X+(X*P))+(Y+(Y+(Y*P^2))+(Z+(Z*P^3)))/A=C$. In this formula, X represents the likelihood value determined as a percentage, and may take into account dealerships past sales history; Y represents the needs value determined as a point value from +10 to −10 scale×100 that's returned from a combination of point values assigned to interview questions and deal/vehicle trigger rules; "Z" represents a Yes/No value associated the prior purchasing behavior of a specific customer for a specific product category; "A" represents the count of the X/Y/Z, which should not be zero; "P" represents the weighting associated with likelihood; "$P^2$" represents the weighting associated with needs; "$P^3$" represents the weighting associated with prior customer behavior; "C" represents a combined score displayed to the consumer in both a numeric and graphical representation by product category ranked from highest to lowest.

The variable "P" may be a percentage defined in a table associated by product category ID and dealer ID and may have a default weighting value of 1. The variable "$P^2$" may be a percentage defined in the associated question point rule/needs question point rule and may have a default weighting value of one. The variable "$P^3$" may be a percentage defined in the associated with prior customer purchase and may have a default weighting value of one.

The application 50 is further configured to undergo updating and tuning to improve accuracy of the PAS. That is, the application 50 is configured to acquire intelligence by reviewing how answers to specific interview questions affect and determine the purchasing outcome of a specific product purchase type. In one example, the application 50 receives as an input the actual outcome of the transaction (i.e., actual consumer behavior) after the deal is closed. The application 50 may receive this data from DMS data 72. Thereafter, the application 50 is configured to compare the actual outcome with the predicted outcome. This enables the application 50 gain information into what actually occurred as compared to what was predicted to occur. Based on this comparison, the application 50 may generate accuracy statistics for updating and tuning the predictive analysis process. For example, the application 50 may determine which identified factors had the highest correlation to the actual outcome. The application 50 may alter the values of weight modifiers accordingly. Updating and tuning may be done autonomously or manually.

VIII. Suggesting Predicted Commodity

The application 50 is configured to suggest for sale to the consumer the commodities predicted by the analysis. The application 50 displays suggestions internally to the dealership personnel and/or consumer. Accordingly, the application 50 uses predictive analytics to transform at least the DMS data 72, consumer resource data 82, and interview response data 92 into a suggestion that the dealership personnel and consumer can readily utilize. As such, the application 50 dynamically and efficiently captures both the probability of sale of the commodity and consumer need of the commodity.

A. Suggestions Page

The application 50 is configured to dynamically display the data and predictive analytics into commodity suggestions. The application 50 may dynamically display this information according to various methods. In one embodiment, the application 50 is configured to display the suggestion on a suggestion page 170, as illustrated in FIG. 13.

The suggestion page 170 may display interactive visuals 172, such as icons, for various commodities to capture both the probability of sale of the commodity and consumer need of the commodity. The application 50 may place the visuals 172 in different locations on the suggestion page 170. The application 50 may relate placement of the visuals 172 to the probability of purchase. For instance, the application 50 may place one visual 172 in the upper left corner for a commodity that is most likely to sell while placing another visual 172 in the lower right corner for a commodity that is least likely to sell. Additionally, the application 50 may size the visuals 172 differently than one another. The application 50 may relate sizing of the visuals 172 to determined need of the consumer. For instance, suppose the application 50 determines that the consumer has negative equity on a vehicle. The application 50 may attribute a large visual 172 to a GAP insurance commodity and a smaller visual 172 to a pre-paid maintenance commodity. In other embodiments, the application 50 may attribute colors to the visuals 172 to represent the probability of sale of the commodity or consumer need of the commodities. For example, the color red may correspond to a low probability of sale or consumer need, while the color green may correspond to high probability of sale or consumer need.

The suggestion page 170 is further configured to provide easy access to consumer and transaction information for confirming and/or editing the same. For example, as shown, the suggestion page 170 displays deal number, consumer name and contact information, vehicle year/make/model, and the like. The suggestion page 170 further provides interview 90 status information, including whether the interview 90 was completed and when the interview 90 was completed. The suggestion page 170 further allows access to interview responses. The application 50 is configured to log and store activity regarding the interview, e.g., when completed, who logged in, how long to complete interview, who accessed, when accessed, and the like.

The application 50 is configured to log and report information regarding interaction with the suggestion page 170, and more specifically, the interaction relating to each commodity.

B. Statistics/Analytics Page

Figure 14:
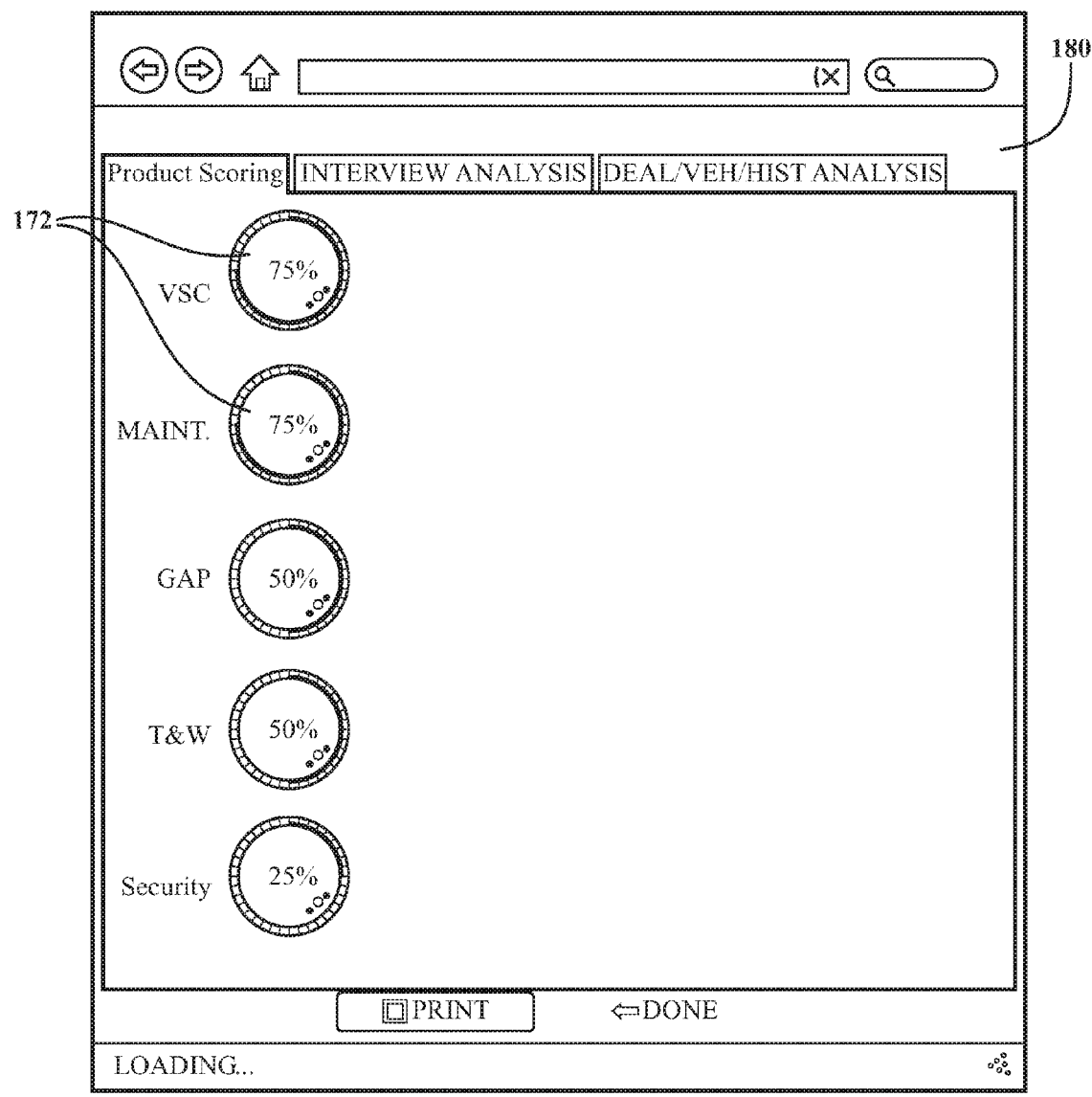
FIG. 14 is a sample screen shot of a statistics page of the application.
Figure 16:
FIG. 16 is a screen shot of an analytics page of the application showing visual indicators associated with each of the suggested automotive commodities as well as various other information to assist dealership personnel.

Alternatively or additionally, the application 50 may display the results of the predictive analysis on a statistics or analytics page 180, as illustrated in any one of FIGS. 14-16. The statistics page 180 allows viewing of the data and analysis associated with the predictive analytics for suggested commodities.

The statistics page 180 enables dealership personnel to see the factors behind the predictive analysis visually represented in both a detailed and summary format. As shown in FIG. 14, the application 50 provides visuals 172 representing the PAS for suggested commodities. Here, the PAS is represented as a percentage indicative of probability of sale or consumer need. For example, as shown in FIG. 14, the application based on the predictive analysis provides visuals 172 showing that a VSC (75%) is more likely to sell than the security product (25%). The PAS may be represented by various other visuals 172, including scales, charts, and the like.

FIG. 15 provides another example of the statistics or analytics page 180. In this example, the application 50 computes the probability of selling each one of a plurality of automotive commodities. The application 50 filters the plurality of automotive commodities to a subset of automotive commodities based on the computed probabilities. In FIG. 15, for example, the application 50 narrows the plurality of commodities (which may be hundreds) to the top seven commodities, i.e., VSC, AFAS maintenance, PermaPlate appearance protection, disability insurance, etch identification, and lease wear & tear. The application 50 further ranks the subset of automotive commodities based on the computed probability of each automotive commodity of the subset. For example, as shown, PermaPlate appearance protection is ranked highest among the automotive commodities thereby indicating that the consumer is most likely to purchase this service. The sale price of each ranked commodity may also be displayed on this page. On this same page, dealership personnel may quickly change product levels, rates, or term. Additionally, dealership personnel no longer need to investigate commodity providers for a specific product because the application 50 allows the dealership to set default products for each provider. In one embodiment, the application 50 is integrated with a provider exchange network (PEN) or Open Dealer Exchange (ODE) wherein the providers send the application 50 real-time rates for the various commodities they provide. The application 50 may allow real time conversations between PEN/ODE members. Additionally, the application 50 may be integrated to allow real time e-rating/e-contracting.

FIG. 16 shows an example of an analytics page of the application 50 further showing visual indicators 188 that are displayable on a display of a computing device. The visual indicators 188 relate to the computed probability of selling the at least one of the automotive commodities. The application 50 may include any suitable dynamic or static visual indicators to show the rankings, or computed probabilities or scores. In FIG. 16, these visual indicators are in the form of separate windows in which each window includes an identification of the predicted commodity, a gauge or meter indicative of the score, a breakdown of the computed needs and likelihood behind each score. The types of commodities may be easily determinable by color of the window. The analytics page in FIG. 16 further provides the dealer personnel or consumer valuable information at a glance. For example, this page may display information, such as interview information, deal factors, and previous automotive purchases, that were most relevant to the determinations made the application 50. This page may also display the vehicle of interest, as well as a percentage ranking of purchases may be similarly situated customers. On this page, the application 50 also provides a "send to DMS" button allowing personnel on demand ability to save the information discerned and collected by the application 50 for this particular consumer such that the information may be retrieved and accessed in the future.

In one embodiment, the application 50 is configured to allow access to the underlying factors 120, 130, 140, 150, 160, weights 162, and/or data that are analyzed in the predictive analysis. Visuals 172 of suggested commodities may be linked to this information such that this information can be readily accessed when desired, i.e., when the visual 172 is electronically selected (clicked). Additionally, the statistics page 180 may visually display interview questions, the responses to the interview questions and associated logic values extracted from the responses.

In one embodiment, the application 50 is configured to conceal access to the underlying factors 120, 130, 140, 150, 160, weights 162, and/or data that are analyzed in the predictive analysis. For example, consumers may be restricted from accessing to the statistics page 180. The application 50 may additionally require entry of a PIN to permit access to the factors 120, 130, 140, 150, 160, weights 162, and/or data.

IX. Presentation of Suggested Commodity

A. Presentation

As shown in FIG. 17, the application 50 is configured to generate a presentation 190 to suggest for sale to the consumer the specific commodity or commodities analytically predicted by the application 50. The application 50 generates the presentation 190 such that it may be displayable on a display of a computing device (of the dealer or the consumer). The presentation 190 is customized for the consumer by having integrated into the presentation the individual consumer data and suggestions for purchasing the at least one automotive commodity for which probability of selling was computed. The presentation 190 is customized automatically based on a combination of the needs triggers from the interview 90, deal type, vehicle information, as well as the analytics provided by the dealership's historical data and the consumer's own prior purchasing habits. The presentation may be customized based on analyzed DMS data 74, consumer resource data 82, and/or interview response data 92. Accordingly, the presentation 190 is not merely a static, one-size fits all, common presentation conventionally provided to consumers regardless of their individual needs.

The presentation 190 is utilized as a sales tool and is presented to the consumer. The presentation 190 presents to the consumer for review the commodities predicted to meet the consumer's needs and/or predicted to have the greatest probability of success to be sold to the consumer as analytically predicted by the application 50. The presentation 190 provides important information about the suggested commodity to help the consumer make an informed decision. The presentation 190 is not static and the same for every consumer. Rather, the presentation 190 is dynamically tailored specifically to each individual consumer.

In one example, the presentation 190 is a single electronic page presentation 190 as shown in FIG. 17. The application 50 imports into the presentation 190 certain suitable information from any of the data described herein. The presentation 190 may be electronically presented onscreen on the computing device 52, or any other suitable device. When presented electronically, the presentation 190 provides an interactive review of the suggested commodities. In some embodiments, the presentation 190 when electronically presented allows the consumer to select interactively certain suggested commodities presented in the presentation 190 to facilitate further events relating to the suggested commodity. For example, one commodity may be selected directly from the presentation 190 to enable the consumer to learn more about the suggested commodity or to take further steps in purchasing the suggested commodity. The presentation 190 may additionally or alternatively be printed on paper for presentation to the consumer.

In one example, the suggested commodity in the presentation 190 is an appearance protection commodity. The application 50 generates the presentation 190 having text identifying the consumer and the vehicle being purchased. The presentation 190 provides commentary identifying the importance of the appearance protection commodity, i.e., that degraded condition and appearance of the vehicle can cause a loss of value to the vehicle. The presentation 190 suggests to the consumer that purchasing the appearance protection commodity is more likely to preserve the value of the vehicle. The application 50 imports into the presentation 190 consumer resource data 82. Here, the imported consumer resource data 82 is a condition adjustment range for the specific vehicle. The application 50 imports vehicle make, model, and year information and coverage terms from DMS data 74 or interview response data 92. The application 50 is configured to calculate a cost per period of protecting the vehicle using the appearance protection commodity (as configured in the setting).

In another example, the presentation 190 is entitled "consumer needs analysis" for promoting to the consumer that the presentation 190 is customized to the consumer's needs. The presentation 190 presents information about the consumer and the dealership based on imported the DMS data 74. The presentation 190 includes graphics relating to the dealership, such as a dealership logo or trademark. The presentation 190 presents to the consumer key findings based on the predictive analysis and explains to the consumer how only commodities having value to the consumer are presented. For example, the presentation 190, as shown in FIG. 17, may present three separate commodities. In one example, a suggested commodity is a vehicle protection plan. The presentation 190 identifies manufacturer warranty information for the specific vehicle being purchased based on the DMS data 74. From the interview response data 92 relating to expected duration of ownership of the vehicle and average miles historically driven, the application 50 analytically determined that consumer would be left unprotected in the event of mechanical failure after approximately 29 months. The presentation 190 explains this determination to the consumer. The presentation 190 further explains for the specific vehicle being purchased the true cost of ownership repair and maintenance as derived from the consumer resource data 82. Based on the application's 50 analysis of historical DMS data 74 and interview response data 92, the presentation 190 additionally presents that 68% of similarly situated clients opted to purchase the vehicle protection plan. The presentation 190 reiterates the suggested vehicle protection plan for purchase based on the presented information.

A second suggested commodity may be a road hazard tire plan. From interview response data 92 relating to consumer driving environment, the presentation 190 reminds the consumer that the roads in which the consumer travels are less than ideal condition and heavy in city driving. Additionally, from DMS data 72, the presentation 190 identifies to the consumer the cost of an original equipment replacement wheel and tire for the specific vehicle being purchased. The presentation 190 reiterates the suggested road hazard tire plan for purchase based on the presented information.

A third suggested commodity in the presentation 190 may be an appearance protection package. From interview response data 92, the presentation 190 reminds the consumer that the consumer typically does not keep the vehicle under covered parking. From DMS data 72 relating to location of consumer residence and related weather conditions for that location, the presentation 190 informs the consumer of the adverse effects of the local weather on the appearance of the vehicle being purchased. From DMS data 72 relating to the manufacturer warranty of the vehicle being purchased, the presentation 190 informs the consumer that paint is not covered under warranty. From DMS data 72 and interview response data 92, the presentation 190 explains that most consumers who plan to keep their vehicle for at least 5 years are interested in keeping their vehicle is new cosmetic condition to increase resale value. From consumer resource data 82, the presentation 190 informs the consumer that the expected resale of the specific vehicle being purchased could fluctuate up to 61% depending on physical appearance. The presentation 190 reiterates the suggested appearance protection plan for purchase based on the presented information. Various other combinations of suggestions and underlying integrated data may be utilized or contemplated besides those described herein and shown in FIG. 17.

Of course, the application 50 is configured to generate the presentation 190 for any suggested commodity available for sale to the consumer. Other examples of presentations 190 include, but are not limited to, a pre-paid maintenance presentation 190, tire and wheel repair plan, a GAP protection presentation, a security plan presentation, and the like. In the security plan presentation, for example, the application 50 may import consumer resource data 82 regarding vehicle security, such as theft rates per area or most stolen vehicles.

Since the presentation 50 is interactive, the application may configure the presentation to have interactive elements such that the consumer can click into the presentation to learn more about certain objects. For example, the presentation may include a "more info" type button to help the consumer learn about the suggested commodity. Once the consumer selects this button, the presentation may open, for example, a pop-up window, or redirect the consumer to a separate page having the appropriate information. Such information may be hosted by the application 50 or any suitable server in communication with the application 50 or presentation. The application 50 may allow real time remote implementation wherein the application can take over the customer's device in seconds with the interactive presentation.

B. Settings

As shown in FIG. 18, the application 50 provides a presentation settings page 192 that allows users to manipulate presentation 190 settings for each specific commodity presented. Settings on the presentation settings page 192 include, but are not limited to, what textual data to include or exclude (e.g., from DMS data 74, consumer resource data 82, interview response data 92), what graphic and multimedia content to include or exclude, how to display the terms and conditions of the commodity, how to display cost of the commodity (e.g., daily or monthly), and the like.

The presentation 190 may provide a comparison of consumer resource data (e.g., cost to own data) for similar vehicles. This allows the consumer to have some context about the presented costs. The application 50 allows selection of which vehicles to compare through the presentation settings page 192.

The application 50 further provides a preview page of the presentation 190 for allowing rapid review and editing of the presentation 190. In one embodiment, the presentation 190 is displayed as a PDF document. The application 50 may save presentations 190 for later use and allow forwarding of the presentation 190 directly to the consumer.

C. Additional Suggestions

The application 50 is configured to suggest for sale additional commodities to accompany a suggested commodity. These suggested additional commodities may be provided based on the information retrieved by the application 50, which can determine the consumer's needs. In one example, the additional commodities may be OEM or aftermarket accessories. The application 50 may retrieve information about the additional commodities from any suitable third-party provider. In one example, the application 50 suggests frequently purchased commodities associated with the suggested commodity. The application 50 may also suggest frequently purchased commodities associated with the particular vehicle being purchased. The application 50 may further provide a link to a full catalog of commodities for the specific year, make, model ordered by popularity. The presentation 190 may present the additional commodities. The presentation 190 based on DMS data 72 suggests that consumers that purchased the specific vehicle being purchased also purchased the presented list of additional commodities. The additional commodities may be mud flaps, floor mats, and running boards. Of course, those skilled in the art realize that various other types of additional commodities may be suggested for sale. The additional commodities may be directly related to the suggested commodities and the needs of the consumer. The additional suggestions may be determined using any suitable algorithms.

Figure 19:
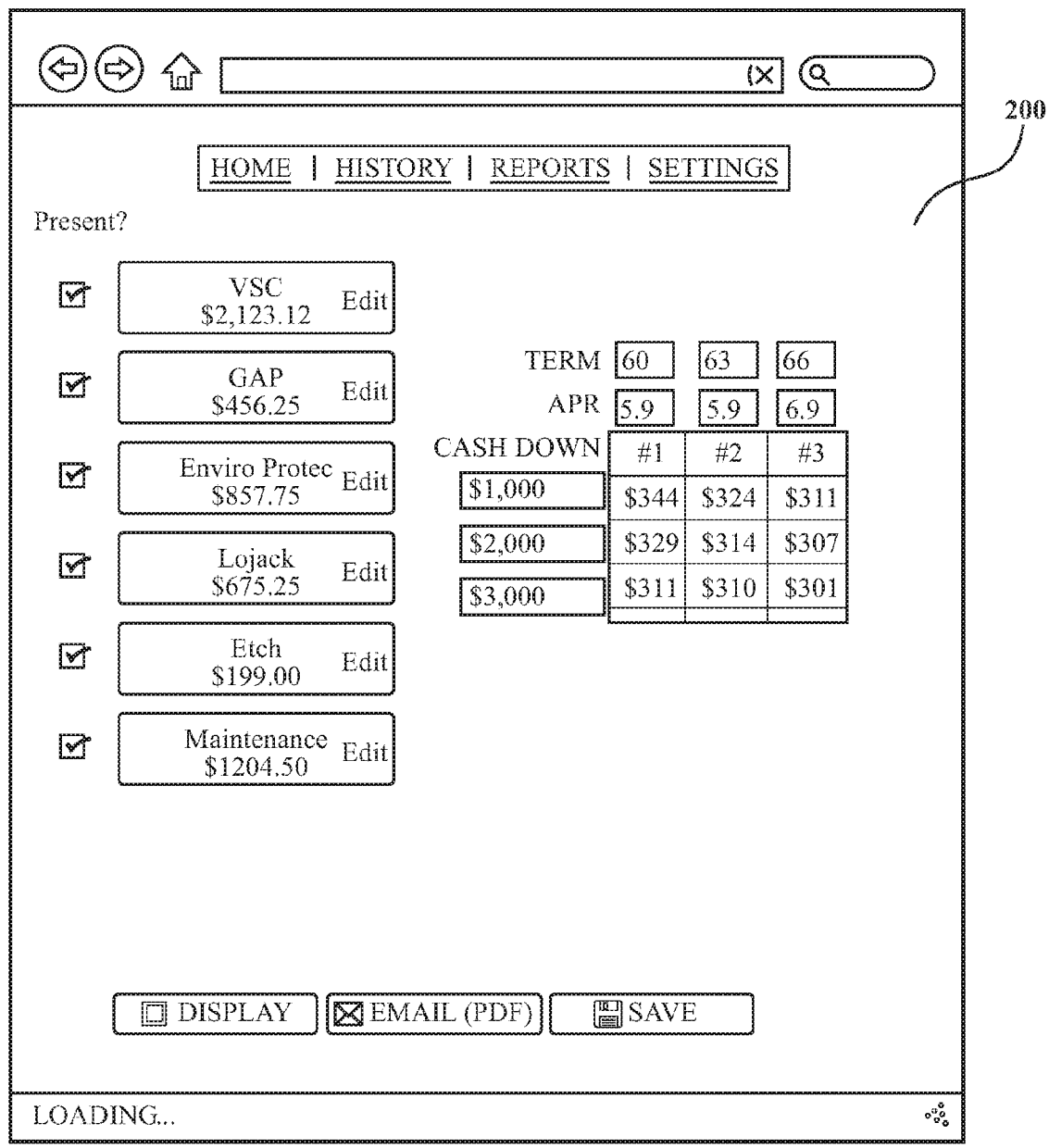
FIG. 19 is a sample screen shot of a consumer options worksheet page of the application.

As shown in FIG. 19, the application 50 further provides a consumer options worksheet page 200 wherein the application 50 imports all suggested commodities and presents the commodities and associated payment options on a single page. Here, the application enables selection as to whether or not to present a suggested commodity. The application 50 enables editing of suggested commodity pricing, levels, coverages, and descriptions as needed. The consumer worksheet page imports DMS data 74, such as APR and Cash Down information. The application 50 calculates the payment for each suggested commodity. Generally, dealership personnel manipulate the information on the consumer worksheet page.

As shown in FIG. 20, the application 50 outputs a commodities summary 210 based on the settings set forth in the consumer options worksheet page 200. The commodities summary 210 is electronically presented by the application 50 and sets forth the suggested commodities and the associated payment options for suggested commodities. In one embodiment, the suggested commodities are dynamic and interactive such that when selected electronically (clicked) the electronic summary updates and displays the corresponding payment options for the selected commodity. The commodities summary page 210 can have various other configurations.

As shown in FIG. 21, the application 50 further provides a declination page 220 to review each of the commodities before closing of the transaction and for memorializing suggested commodities declined by the consumer. The application 50 provides an interactive and easy way to accept or decline the suggested commodities. For example, each commodity may be dragged and dropped into an Accept or Decline column or bucket. The declination page 220 also provides the ability to make edits (e.g., price, name, level, description). To increase the probability of last-minute sales before consumer declination, the declination page 220 further provides a selection of the cost per period for each commodity. As shown in FIG. 21, the cost per period is selected as "per week." The declination page 220 may also enable showing or hiding of the full price.

As shown in FIG. 22, the application 50 is configured to output an acceptance summary 230 based on the selections in the declination page. The acceptance summary 230 is electronically presented and sets forth accepted and declined suggested commodities. For the declined suggested commodities, the application 50 imports the price per period selected for each commodity in an attempt to further inform the consumer of the cost of the declined commodity, thereby potentially increasing sales. The acceptance summary page can have various other configurations.

Figure 23:
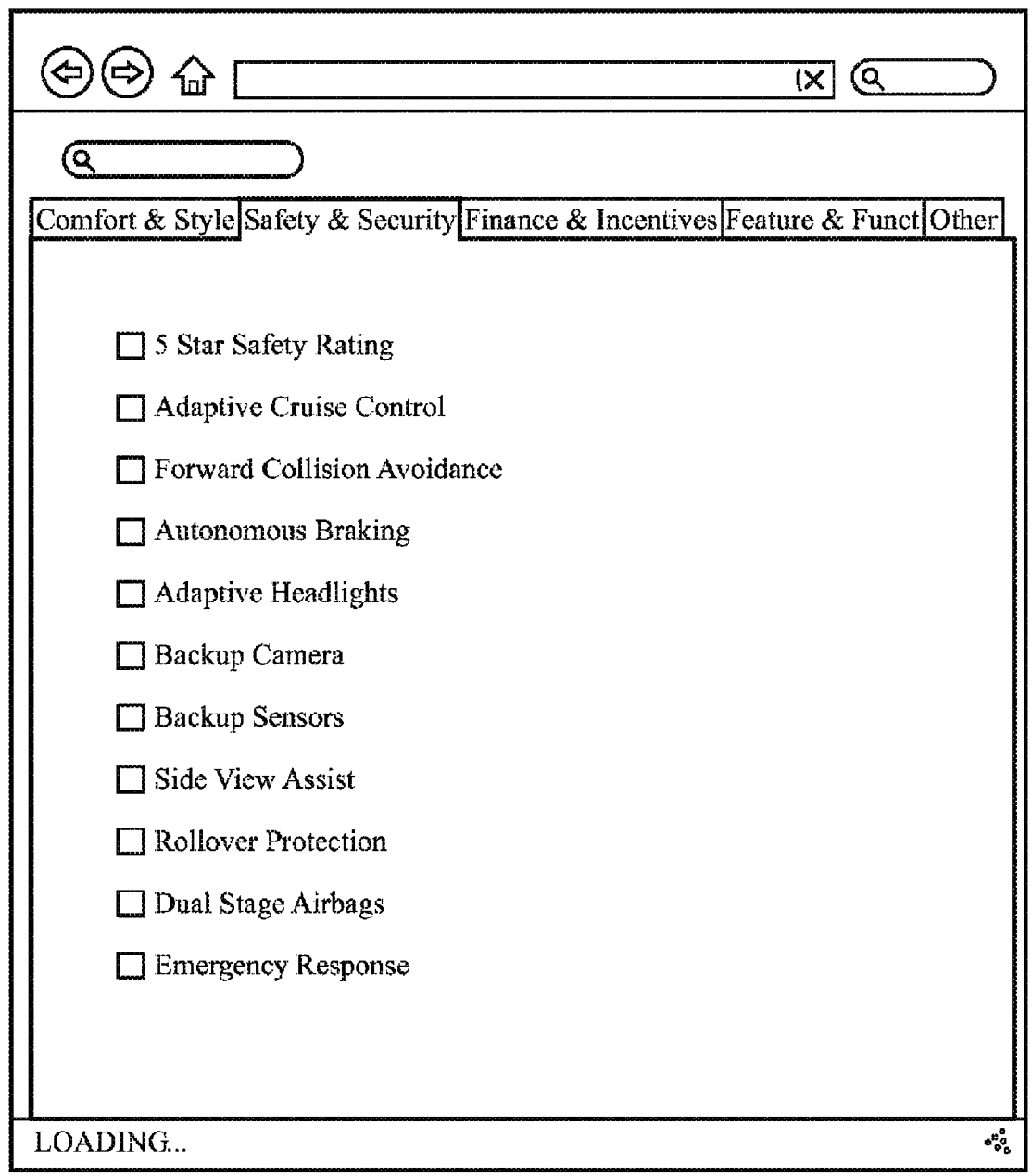
FIG. 23 is a sample screen shot of a page presented by the application for selecting select features or keywords associated with the consumer, vehicle, and/or deal.

As shown in FIG. 23, the application 50 may enable dealership personnel to select a plurality of features or keywords associated with the consumer, vehicle, and/or deal. The selected features are presented to assist in closing a deal. The application 50 may categorize the features in any suitable fashion. In one example, the features are categorized in groups titled comfort and style, safety and security, finance and incentives, features and functionality, and other. The application 50 further allows a customized description of the feature as well as the pros and cons associated with the feature. The application 50 outputs for the consumer an electronic summary of the selected features and the associated descriptions (pros and cons) of the features.

X. Data Reporting

Figure 24:
FIG. 24 is sample screen shot of a reporting page of the application.

A sample screenshot illustrating specialized reports that may be generated by the application 50 is provided in FIG. 24. This reporting may be performed before or after deals close. In FIG. 24, the application 50 allows the data for reporting to be broken down into various categories, including, current performance, product review, trend analysis, user/audit, and utilization. The current performance reports data for product penetration for specified times and PVR (income per vehicle retailed) count reports. This category may be broken down into sub-categories for reporting, such as PVR analysis, F&I summary, F&I control log, lender analysis, manager rankings, and system utilization. Such reports, combined with the predictive analysis, provide information to dealers not previously acquirable. Those skilled in the art appreciate that various other reports, especially those in view of the predictive nature of the system and method, may be generated the application 50.

A reporting module 250 is configured to report dealership activities based on the gathered data and the actual outcome of the deal. In other words, the reporting module 250 examines past and present activities to predict and forecast what is likely to occur in the future. The reporting module 250 assists dealers, agents, and providers in making business decisions.

One example of the reporting module 250 is illustrated in FIG. 1. In FIG. 1, the reporting module 250 stands alone from the application 50 described herein. In another embodiment, the reporting module 250 is integrated into the application 50. The reporting module 250 may be implemented into the computing device 52, as shown in FIG. 1. Alternatively, the reporting module 250 may be implemented on a different device other than the computing device 52.

The reporting module 250 provides an electronic interface for allowing selection and modification of reporting preferences. The reporting module 250 is configured to provide advanced and customized reporting of DMS data 74, consumer resource data 82, and interview response data 92. The reporting module 250 is configured to provide hierarchal reporting. Here, the reporting module 250 reports DMS data 74 on multiple selectable levels. For example, the reporting module 250 may report DMS data 74 from the store level, group level, enterprise level, or super admin level. The reporting module 250 may also provide Ad Hoc reporting. The reporting module 250 enables selected reported data to be displayed on an electronic dashboard for allowing quick review of the same. The dashboard may receive as an input a set business goal relating to sales, and the like. The reporting module 250 compares the set business goal with the reported data for the education of the user.

To further promote goal setting, the reporting module 250 may automatically generate business goals by gathering data from industry averages and comparing the reported data to the industry averages. The reporting module 250 may also extrapolate real time averages from active users across the application 50. The reporting module 250 may compare the reported data to the averages from the active users. By displaying the comparisons on the dashboard, the reporting module 250 provides instant feedback performance. As such, the reporting module 250 eliminates deficiencies in conventional business practices, such as the massive amount of effort needed to gather the information as well the low motivation of sales personnel to manually generate a report of the data.

The reporting module 250 may include a standard library of reports that is made available to the dealers. The reports in the standard library are customizable to a certain degree using filters and the like. However, the reports primarily remain intact so that hierarchal reporting would still operate. The reporting module 250 enables users to save a version of the customized report if significant modifications are made to the standard report.

The reporting module 250 enables customization of the reports through various filters to take into account the different ways in which a dealership 64 may utilize the DMS 70. Examples of filters include, but are not limited to, timeframe, hierarchy, transaction status or date, location, consumer information. Additionally, consumer resource data 82 and interview response data 92 may be filtered. The reporting module 250 may also filter data obtained from the predictive analysis, including, but not limited to, frequency of suggestion and PAS scores for suggested commodities. The reporting module 250 allows selection of which fields should be displayed in the report and how the fields should be ordered. The report module further allows setting of calculations associated with the reported data. The calculations include, but are not limited to Counts, Sums, Averages, Penetration (count percentage), or any other pertinent calculation function for a selected field.

Reports may be automatically generated and delivered. The generated reports may be automatically emailed. Additionally, the data displayed on the dashboard may be automatically generated and emailed. Reports may be generated at any suitable frequency designated by the user. Such reports can be displayed directly in the application or emailed to external sources.

The reporting module 250 also enables reported data to be shared and exported. The exported reports can be shared in an electronic community thereby allowing others to download the reported data and modify the reported data for their own use.

The reporting module 250 is configured to take selected reports and generate graphic outputs (e.g., charts and graphs) illustrating the data in the reports. The reporting module 250 takes the reported data and the associated graphics output and electronically generates a reporting presentation. The reporting module 250 provides customization of what reported data is selected and how the reported data is presented. For example, one reporting presentation may be generated on a daily basis based on reported data relating to what deals are in a non-pending status followed by contracts in transit (CIT) reports. In another example, the reporting presentation may be generated on a monthly basis based on reported data relating to performance of a store as a whole as well as performance of salespersons, managers, and the like. The reporting presentation may further include trend analysis YTD and conclude with next month's goals. As such, presentation of reported data is dynamic and accurate such that the business objectives are continuously updated and not complacent.

In another example, the reporting module 250 generates an F&I summary report summarizing and categorizing the various types of commodities, the number of units sold, the total dollars grossed, and the like. Additionally, sales averages for various F&I managers affiliated with the dealership may be tracked.

The reporting module 250 enables selection of various types of reports. One type of report is a list report, which creates a tabular report with the values of selected fields for records matching the specified criteria. Examples of selected fields include pending deals, deals by managers, etc. Another type of report is a detailed report, which may contain all of the information incorporated in the list report and include associated calculations and charts.

Other features of the application 50 include the ability to accept security deposits. Such security deposits are typically for lease deals.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A computer-implemented system, comprising:
   at least one processor;
   a non-transitory memory; and instructions stored on the non-transitory memory, wherein the instructions when executed by the at least one processor cause the at least one processor to:

retrieve, over a network, individual consumer data about a consumer interested in acquiring a vehicle, the individual consumer data indicative of at least one of (i) present or future needs of the consumer and (ii) historical behavior of the consumer, wherein the individual consumer data is retrieved from an interview being electronically administered to the consumer using a computing device accessible by the consumer;

retrieve dealer management system (DMS) data from a DMS of an automotive dealership, the DMS data indicative of transactional data relating to a plurality of automotive commodities being finance or insurance (F&I) products or services associated with the vehicle of interest;

retrieve, from the DMS, group consumer data about other consumers who have previously purchased the vehicle of interest, vehicles similar to the vehicle of interest, or automotive commodities associated with the vehicle of interest, the group consumer data indicative of at least one of (i) past needs of the other consumers and (ii) historical behavior of the other consumers;

utilize one or more application programming interfaces (APIs) to acquire, over a network, consumer resource data from an online consumer resource provided on a website hosted by a web server, the one or more APIs being utilized to provide accessibility to various datasets provided by the consumer resource relating to at least one of the automotive commodities and the vehicle of interest;

retrieve, from the DMS, deal data indicative of transactional terms relating to at least one of (i) current acquisition of the vehicle of interest by the consumer, and (ii) past acquisition of the vehicle of interest or vehicles similar to the vehicle of interest by other consumers;

predicatively analyze the individual consumer data, DMS data, group consumer data, consumer resource data, and deal data by utilizing a computer-implemented algorithm executed by the at least one processor and being configured to compute a weight for each of the consumer data, DMS data, group consumer data, consumer resource data, and deal data, combine the computed weights, and output a predictive score based on the combined weights;

compute a probability of selling at least one of the automotive commodities to the consumer based on the outputted predictive score resulting from predictive analysis of the individual consumer data, DMS data, group consumer data, consumer resource data, and deal data;

generate a visual indicator that is displayable on a display of a computing device accessible by personnel of the automotive dealership, wherein the visual indicator relates to the computed probability of selling the at least one of the automotive commodities; and output an electronic presentation for the consumer being displayable on a display of a computing device accessible by the consumer and being customized for the consumer by having integrated into the presentation at least portions of the individual consumer data and suggestions for purchasing the at least one automotive commodity for which probability of selling was computed.

2. The computer-implemented system of claim 1 wherein the instructions when executed by the at least one processor further cause the at least one processor to compute the probability of selling each one of the plurality of automotive commodities and filter the plurality of automotive commodities to a subset of automotive commodities based on the computed probabilities.

3. The computer-implemented system of claim 2 wherein the instructions when executed by the at least one processor further cause the at least one processor to rank the subset of automotive commodities based on the computed probability of each automotive commodity of the subset.

4. The computer-implemented system of claim 1 wherein the at least one processor and the non-transitory memory are implemented on the computing device accessible by personnel of the automotive dealership and with the computing device being located at the automotive dealership.

5. The computer-implemented system of claim 1 further comprising a reporting module implemented by the at least one processor wherein the instructions when executed by the at least one processor further cause the at least one processor to utilize the reporting module to generate a report electronically presentable on a display of a computing device wherein the report provides trends about sales performance of at least one of (i) the automotive commodities and (ii) dealership personnel tasked with selling the automotive commodities.

6. The computer-implemented system of claim 1 wherein the computing device on which the interview is electronically administered to the consumer is further defined as a mobile computing device belonging to the consumer.

7. A computer-implemented method, wherein one or more computing devices comprising non-transitory memory and at least one processor are programmed to perform steps of:

retrieving, with the at least one processor over a network, individual consumer data about a consumer interested in acquiring a vehicle, the individual consumer data indicative of at least one of (i) present or future needs of the consumer and (ii) historical behavior of the consumer, and wherein the individual consumer data is retrieved from an interview being electronically administered to the consumer using a computing device accessible by the consumer;

retrieving, with the at least one processor, dealer management system (DMS) data from a DMS of an automotive dealership, the DMS data indicative of transactional data relating to a plurality of automotive commodities being finance or insurance (F&I) products or services associated with the vehicle of interest;

retrieving, with the at least one processor, group consumer data from the DMS about other consumers who have previously purchased the vehicle of interest, vehicles similar to the vehicle of interest, or automotive commodities associated with the vehicle of interest, the group consumer data indicative of at least one of (i) past needs of the other consumers and (ii) historical behavior of the other consumers;

utilizing, with the at least one processor, one or more application programming interfaces (APIs) to acquire, over a network, consumer resource data from an online consumer resource provided on a website hosted by a web server, the one or more APIs being utilized to provide accessibility to various datasets provided by the consumer resource relating to at least one of the automotive commodities and the vehicle of interest;

retrieving, with the at least one processor, deal data from the DMS indicative of transactional terms relating to at least one of (i) current acquisition of the vehicle of interest by the consumer, and (ii) past acquisition of the vehicle of interest or vehicles similar to the vehicle of interest by other consumers;

predicatively analyzing, with the at least one processor, the individual consumer data, DMS data, group consumer data, consumer resource data, and deal data by utilizing a computer-implemented algorithm executed by the at least one processor for computing a weight for each of the consumer data, DMS data, group consumer data, consumer resource data, and deal data, combining the computed weights, and outputting a predictive score based on the combined weights;

computing, with the at least one processor, a probability of selling at least one of the automotive commodities to the consumer based on the outputted predictive score resulting from predictive analysis of the individual consumer data, DMS data, group consumer data, consumer resource data, and deal data;

generating, with the at least one processor, a visual indicator that is displayable on a display of a computing device accessible by personnel of the automotive dealership, wherein the visual indicator relates to the computed probability of selling the at least one of the automotive commodities; and outputting, with the at least one processor, an electronic presentation for the consumer being displayable on a display of a computing device accessible by the consumer and being customized for the consumer by having integrated into the presentation at least portions of the individual consumer data and suggestions for purchasing the at least one automotive commodity for which probability of selling was computed.

8. The computer-implemented method of claim 7 wherein the one or more computing devices comprising non-transitory memory and the at least one processor are further programmed to perform steps of:

computing the probability of selling each one of the plurality of automotive commodities; and filtering the plurality of automotive commodities to a subset of automotive commodities based on the computed probabilities.

9. The computer-implemented method of claim 8 wherein the one or more computing devices comprising non-transitory memory and the at least one processor are further programmed to perform step of ranking the subset of automotive commodities based on the computed probability of each automotive commodity of the subset.

10. The computer-implemented method of claim 7 wherein the one or more computing devices comprising non-transitory memory and the at least one processor are further programmed with a reporting module to perform step of generating, using the reporting module, a report electronically presentable on a display of a computing device wherein the report provides trends about sales performance of at least one of (i) the automotive commodities and (ii) dealership personnel tasked with selling the automotive commodities.

11. A computer software product comprising instructions storable on a non-transitory computer-readable medium wherein the instructions when executed by at least one processor, are configured to:

retrieve, over a network, individual consumer data about a consumer interested in acquiring a vehicle, the individual consumer data indicative of at least one of (i) present or future needs of the consumer and (ii) historical behavior of the consumer, wherein the individual consumer data is retrieved from an interview being electronically administered to the consumer using a computing device accessible by the consumer;

retrieve dealer management system (DMS) data from a DMS of an automotive dealership, the DMS data indicative of transactional data relating to a plurality of automotive commodities being finance or insurance (F&I) products or services associated with the vehicle of interest;

retrieve, from the DMS, group consumer data about other consumers who have previously purchased the vehicle of interest, vehicles similar to the vehicle of interest, or automotive commodities associated with the vehicle of interest, the group consumer data indicative of at least one of (i) past needs of the other consumers and (ii) historical behavior of the other consumers;

utilize one or more application programming interfaces (APIs) to acquire, over a network, consumer resource data from an online consumer resource provided on a website hosted by a web server, the one or more APIs being utilized to provide accessibility to various datasets provided by the consumer resource relating to at least one of the automotive commodities and the vehicle of interest;

retrieve, from the DMS, deal data indicative of transactional terms relating to at least one of (i) current acquisition of the vehicle of interest by the consumer, and (ii) past acquisition of the vehicle of interest or vehicles similar to the vehicle of interest by other consumers;

predicatively analyze the individual consumer data, DMS data, group consumer data, consumer resource data, and deal data by utilizing a computer-implemented algorithm executed by the at least one processor and being configured to compute a weight for each of the consumer data, DMS data, group consumer data, consumer resource data, and deal data, combine the computed weights, and output a predictive score based on the combined weights;

compute a probability of selling at least one of the automotive commodities to the consumer based on the outputted predictive score resulting from predictive analysis of the individual consumer data, DMS data, group consumer data, consumer resource data, and deal data;

generate a visual indicator that is displayable on a display of a computing device accessible by personnel of the automotive dealership, wherein the visual indicator relates to the computed probability of selling the at least one of the automotive commodities; and output an electronic presentation for the consumer being displayable on a display of a computing device accessible by the consumer and being customized for the consumer by having integrated into the presentation at least portions of the individual consumer data and suggestions for purchasing the at least one automotive commodity for which probability of selling was computed.

12. The computer software product of claim 11 wherein the instructions when executed by the at least one processor are further configured to:

compute the probability of selling each one of the plurality of automotive commodities;

filter the plurality of automotive commodities to a subset of automotive commodities based on the computed probabilities; and rank the subset of automotive commodities based on the computed probability of each automotive commodity of the subset.

13. The computer software product of claim 11 wherein the instructions when executed by the at least one processor are further configured to generate, using a reporting module, a report electronically presentable on a display of a computing device wherein the report provides trends about sales performance of at least one of (i) the automotive commodities and (ii) dealership personnel tasked with selling the automotive commodities.

* * * * *